(12) United States Patent  
Gharibi et al.

(10) Patent No.: US 12,088,565 B2  
(45) Date of Patent: Sep. 10, 2024

(54) SYSTEMS AND METHODS FOR PRIVACY PRESERVING TRAINING AND INFERENCE OF DECENTRALIZED RECOMMENDATION SYSTEMS FROM DECENTRALIZED DATA

(71) Applicant: TripleBlind, Inc., Kansas City, MO (US)

(72) Inventors: Gharib Gharibi, Overland Park, KS (US); Greg Storm, Kansas City, MO (US); Ravi Patel, Kansas City, MO (US); Babak Poorebrahim Gilkalaye, Kansas City, MO (US); Riddhiman Das, Parkville, MO (US)

(73) Assignee: Triplelind Holdings, Inc., Kansas City, MO (US)

( * ) Notice: Subject to any disclaimer, the term of this patent is extended or adjusted under 35 U.S.C. 154(b) by 172 days.

(21) Appl. No.: 17/939,585

(22) Filed: Sep. 7, 2022

(65) Prior Publication Data

US 2023/0300115 A1  Sep. 21, 2023

Related U.S. Application Data

(63) Continuation of application No. 17/743,887, filed on May 13, 2022, now Pat. No. 11,531,782, and a
(Continued)

(51) Int. Cl.  
*G06F 16/00* (2019.01)  
*G06F 17/16* (2006.01)  
(Continued)

(52) U.S. Cl.  
CPC .......... *H04L 63/0428* (2013.01); *G06F 17/16* (2013.01); *G06F 18/2113* (2023.01);  
(Continued)

(58) Field of Classification Search  
None  
See application file for complete search history.

(56) References Cited

U.S. PATENT DOCUMENTS 5,036,457 A  7/1991  Glaser et al.  
6,668,325 B1  12/2003  Collberg  
(Continued)

OTHER PUBLICATIONS

Bonawitz et al., "Practical secure aggregation for privacy-preserving machine learning", In proceedings of 2017 ACM SIGSAC Conference on Computer and Communications Security, pp. 1175-1191, [retrieved on Dec. 13, 2022] from the Internet <URL: https://dl/acm/org/dol/pdf/10.1145/3133956.3133982> Entire document.

(Continued)

*Primary Examiner* — Hasanul Mobin

(57) ABSTRACT

A system and method are disclosed for training a recommendation system. The method includes initiating, at a server device, an item-vector matrix V, wherein the item-vector matrix V includes a value m related to a total number of items across one or more client devices and a value d representing a hidden dimension, transmitting the item-vector matrix V to each client device, wherein each client device trains a local matrix factorization model using a respective user vector U and the item-vector matrix V to generate a respective set of gradients on each respective client device, receiving, via a secure multi-party compute protocol, and from each client device, the respective set of gradients, updating the item-vector matrix V using the respective set of gradients from each client device to generate an updated item-vector matrix V and downloading the updated item-vector matrix V to at least one client device.

18 Claims, 20 Drawing Sheets

Related U.S. Application Data continuation of application No. 17/742,808, filed on May 12, 2022, now Pat. No. 11,599,671, and a continuation of application No. 17/180,475, filed on Feb. 19, 2021, which is a continuation-in-part of application No. 17/176,530, filed on Feb. 16, 2021, now Pat. No. 11,895,220, and a continuation-in-part of application No. 16/828,085, filed on Mar. 24, 2020, now Pat. No. 11,582,203, said application No. 17/176,530 is a continuation of application No. 16/828,354, filed on Mar. 24, 2020, now Pat. No. 10,924,460, said application No. 17/180,475 is a continuation-in-part of application No. 16/828,420, filed on Mar. 24, 2020, now Pat. No. 11,363,002, and a continuation-in-part of application No. 16/828,216, filed on Mar. 24, 2020.

(60) Provisional application No. 63/241,255, filed on Sep. 7, 2021, provisional application No. 63/020,930, filed on May 6, 2020, provisional application No. 62/948,105, filed on Dec. 13, 2019.

(51) Int. Cl.

| | |
|---|---|
| *G06F 18/2113* | (2023.01) |
| *G06F 18/24* | (2023.01) |
| *G06N 3/04* | (2023.01) |
| *G06N 3/082* | (2023.01) |
| *G06Q 20/40* | (2012.01) |
| *G06Q 30/0601* | (2023.01) |
| *H04L 9/00* | (2022.01) |
| *H04L 9/06* | (2006.01) |
| *H04L 9/40* | (2022.01) |

(52) U.S. Cl.
CPC .............. *G06F 18/24* (2023.01); *G06N 3/04* (2013.01); *G06N 3/082* (2013.01); *G06Q 20/401* (2013.01); *G06Q 30/0623* (2013.01); *H04L 9/008* (2013.01); *H04L 9/0625* (2013.01); *G06Q 2220/00* (2013.01); *H04L 2209/46* (2013.01)

(56) References Cited

U.S. PATENT DOCUMENTS

| | | |
|---|---|---|
| 9,009,089 B1 | 4/2015 | El Defrawy et al. |
| 9,110,955 B1 | 8/2015 | Bernhardsson |
| 9,464,043 B2 | 10/2016 | Roberge et al. |
| 10,198,399 B1 | 2/2019 | Fritchman |
| 10,225,365 B1 | 3/2019 | Hotchkies |
| 10,311,372 B1 | 6/2019 | Hotchkies |
| 10,360,220 B1 | 7/2019 | Gupta |
| 10,958,553 B2* | 3/2021 | Pant .................. H04L 43/06 |
| 11,093,864 B1 | 8/2021 | Reese |
| 2003/0009482 A1 | 1/2003 | Benerjee |
| 2007/0192864 A1 | 8/2007 | Bryant |
| 2008/0208560 A1 | 8/2008 | Johnson et al. |
| 2009/0063485 A1 | 3/2009 | Schneider |
| 2010/0114964 A1 | 5/2010 | Kerschbaum |
| 2012/0030159 A1* | 2/2012 | Pilaszy ............... G06Q 10/00 706/46 |
| 2013/0124491 A1 | 5/2013 | Pepper |
| 2014/0188865 A1* | 7/2014 | Karatzoglou ...... G06Q 30/0282 707/732 |
| 2015/0089243 A1 | 3/2015 | Veugen |
| 2015/0156204 A1 | 6/2015 | Resch |
| 2015/0242136 A1 | 8/2015 | Lin |
| 2015/0288662 A1 | 10/2015 | Bilogrevic |
| 2016/0156595 A1 | 6/2016 | Wu |
| 2016/0171228 A1* | 6/2016 | Bhagat ............... G06F 21/6254 705/14.66 |
| 2016/0205095 A1 | 7/2016 | Morel |
| 2017/0041300 A1 | 2/2017 | Kim et al. |
| 2017/0161639 A1* | 6/2017 | Zeng .................. G06F 16/9032 |
| 2017/0236123 A1 | 8/2017 | Ali |
| 2017/0372201 A1 | 12/2017 | Gupta |
| 2018/0075137 A1* | 3/2018 | Lifar .................. G06F 16/337 |
| 2018/0095719 A1 | 4/2018 | Winestock |
| 2018/0205707 A1 | 7/2018 | Bellala |
| 2018/0212770 A1 | 7/2018 | Costa |
| 2018/0330192 A1* | 11/2018 | Atasu ................ G06F 18/2321 |
| 2019/0005399 A1* | 1/2019 | Noguchi ............... G06N 3/044 |
| 2019/0050204 A1 | 2/2019 | Hutter |
| 2019/0073580 A1 | 3/2019 | Dzhulgakov |
| 2019/0073581 A1 | 3/2019 | Chen |
| 2019/0073586 A1 | 3/2019 | Chen |
| 2019/0073590 A1 | 3/2019 | Wu |
| 2019/0114511 A1 | 4/2019 | Gao et al. |
| 2019/0208417 A1 | 7/2019 | Kang |
| 2019/0268149 A1 | 8/2019 | Kariv |
| 2019/0279088 A1 | 9/2019 | Zhang |
| 2019/0312727 A1 | 10/2019 | Del Pino |
| 2019/0318421 A1 | 10/2019 | Lyonnet |
| 2019/0332944 A1 | 10/2019 | Bai |
| 2019/0372760 A1 | 12/2019 | Zheng |
| 2020/0104670 A1 | 4/2020 | Seo |
| 2020/0134490 A1* | 4/2020 | Chen .................... G06Q 30/02 |
| 2020/0167127 A1 | 5/2020 | Lokappa |
| 2020/0167834 A1 | 5/2020 | Matsuoka |
| 2020/0220851 A1 | 7/2020 | Storm |
| 2020/0228313 A1 | 7/2020 | Storm |
| 2020/0242483 A1 | 7/2020 | Rao et al. |
| 2020/0242492 A1 | 7/2020 | Goel |
| 2020/0322346 A1* | 10/2020 | Van Rensburg ...... H04L 63/105 |
| 2020/0327250 A1 | 10/2020 | Wang et al. |
| 2020/0342288 A1* | 10/2020 | Xi ........................ G06F 17/11 |
| 2020/0358599 A1 | 11/2020 | Baracaldo Angel |
| 2020/0364608 A1 | 11/2020 | Anwar |
| 2020/0372360 A1 | 11/2020 | Vu |
| 2020/0387797 A1 | 12/2020 | Ryan et al. |
| 2021/0073036 A1 | 3/2021 | Kim |
| 2021/0073678 A1 | 3/2021 | Chu et al. |
| 2021/0081807 A1 | 3/2021 | Tueno |
| 2021/0089878 A1 | 3/2021 | Greenwald |
| 2021/0110891 A1 | 4/2021 | Galvez |
| 2021/0111875 A1 | 4/2021 | Le Saint |
| 2021/0117804 A1 | 4/2021 | Koehler |
| 2021/0073677 A1 | 6/2021 | Peterson et al. |
| 2021/0174243 A1* | 6/2021 | Angel .................... H04L 9/083 |
| 2021/0192279 A1 | 6/2021 | Laaksonen et al. |
| 2021/0194858 A1 | 6/2021 | Storm |
| 2021/0209247 A1 | 7/2021 | Mohassel |
| 2021/0209514 A1 | 7/2021 | Kim et al. |
| 2021/0256403 A1 | 8/2021 | Tang et al. |
| 2021/0264271 A1 | 8/2021 | Gebre |
| 2021/0406406 A1 | 12/2021 | Hutter |
| 2022/0351039 A1 | 11/2022 | Satheesh Kumar |
| 2023/0300115 A1* | 9/2023 | Gharibi ................ G06N 3/084 706/3 |

OTHER PUBLICATIONS

Nilsson et al., "Publicly Auditable Privacy Revocation in Practice", (Jul. 2021) [retrieved on Dec. 13, 2022] from the Internet, URL:https://lup.lub.lu.se/luur/download?func=downloadFile&recordOId=9061208&fileOId=9061210> Entire document.

Xu et al., "Verifynet: Secure and verifiable federated learning", IEEE Transactions on Information Forensics and Security, Jul. 17, 2019, vol. 15, pp. 911-926. [retrieved on Dec. 13, 2022] from the Internet URL:https://www.researchgate.net/profile/Guowen-Xu-5/publication/334526283_VerifyNet_Secure_and_Verifiable_Federated_Learning/links/6087acf3907dcf667bc71b17/VerifyNet-Secure-and-Verifiable-Federated-Learning.pdf Entire document.

Zhang et al., "Privacy-Preserving Deep Learning Based on Multi-party Secure Computation: A Survey", IEEE Internet of Things Journal, vol. 6, No. 13, (2021), 10412-10429, Feb. 11, 2021, Retrieved on Nov. 13, 2022 from https://ieeexplore.IEEE.org/abstract/document/9352960, entire document.

(56) References Cited

OTHER PUBLICATIONS

Feng et al., "Multi-Participant Multi-Class Vertical Federated Learning", arXiv preprint arXiv:2001.11154, Jan. 30, 2020, [online], [retrieved on Dec. 9, 2022]. Retrieved from the Internet URL:https://arxiv.org/pdf/2001.11154.pdf, entire document, especially p. 3, col. 1, paragraph 1.

Liu et al., "Asymmetrical Vertical Federated Learning", arXiv preprint arXiv:2004.07427, Jun. 11, 2020. [online], [retrieved one Dec. 9, 2022]. Retrieved from the Internet URL:https://arxiv.org/pdf/2004.07427.pdf, entire document, especially p. 2, col. 1, paragraph 2.

Saeed et al., Federated Self-Supervised Learning of Multi-Sensor Representations for Embedded Intelligence, IEEE Internet of Things Journal, Jul. 25, 2020, pp. 1030-1040, [online], [retrieved on Dec. 9, 2022]. Retrieved from Internet <URL/https://arxiv.org/pdf/2007.13018.pdf> entire document, especially p. 6, col. 1, paragraph 2.

Jia et al., "Personalized recommendation algorithm for mobile based on federated matrix factorization", In Journal of Physics: Conference Series Mar. 1, 2021 (vol. 1802, No. 3, p. 032021). IOP Publishing. [retrieved on Dec. 13, 2022] Retrieved from the Internet <URL:https://iopscience.iop.org/article/10.1088/1742-6596/1802/3/032021/pdf> entire document (especially pp. 1, 2, 5, 6, 8, 9, 10).

Chandiramani, et al., "Performance Analysis and Distributed and Federated Learning Models on Private Data", Procedia Computer Science, 165(2019), pp. 349-355. (Year: 2019).

\* cited by examiner

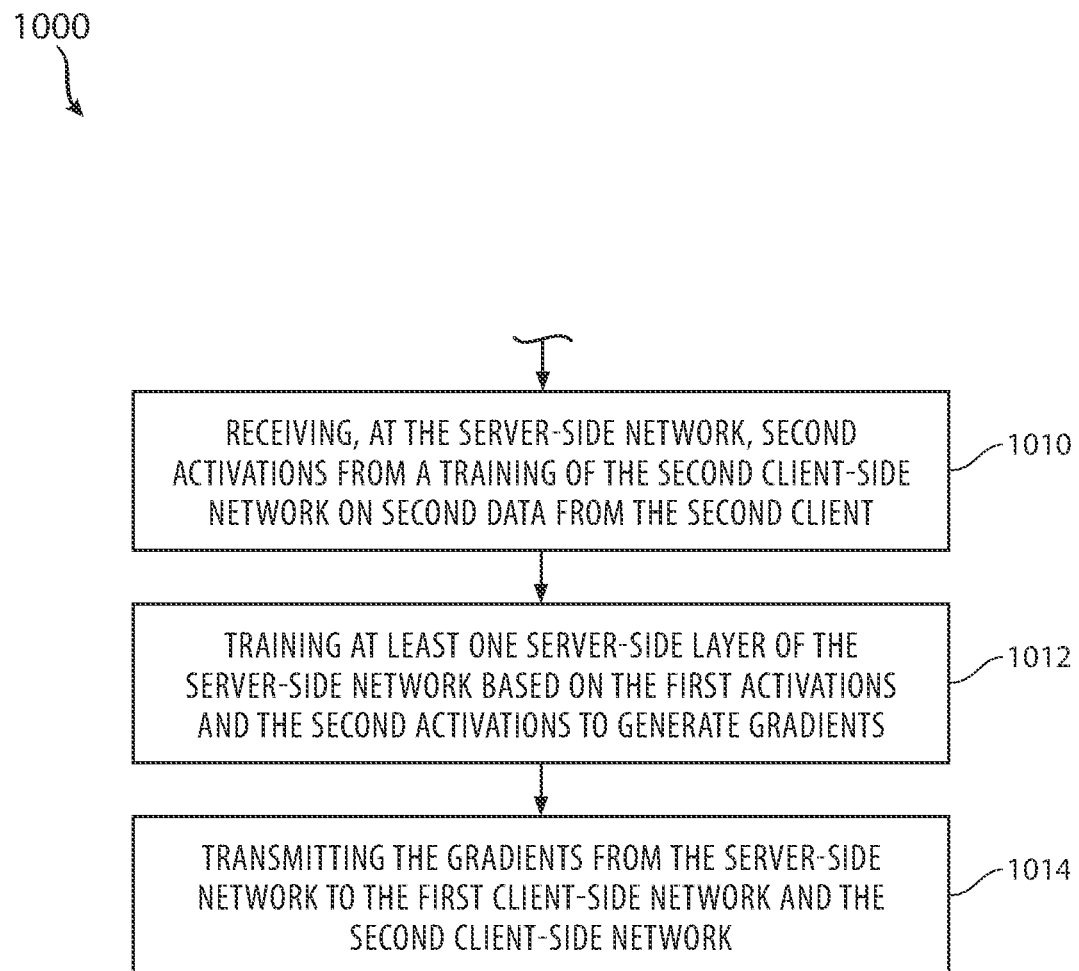
FIG. 10 *(Continued)*

US 12,088,565 B2

SYSTEMS AND METHODS FOR PRIVACY PRESERVING TRAINING AND INFERENCE OF DECENTRALIZED RECOMMENDATION SYSTEMS FROM DECENTRALIZED DATA

PRIORITY CLAIM

The present application claims priority to U.S. Provisional Application No. 63/241,255, filed Sep. 7, 2021, the content of which is incorporated herein by reference.

The present application is a continuation of U.S. patent application Ser. No. 17/180,475, filed Feb. 19, 2021, which claims priority to U.S. Provisional Application No. 63/020,930, filed on May 6, 2020; and is a continuation-in-part of U.S. application Ser. No. 16/828,085, filed Mar. 24, 2020, which claims priority to U.S. Provisional App. No. 62/948,105, filed on Dec. 13, 2019; and is a continuation-in-part of U.S. application Ser. No. 16/828,216, filed Mar. 24, 2020, which claims priority to U.S. Provisional App. No. 62/948,105, filed on Dec. 13, 2019; and is a continuation-in-part of U.S. application Ser. No. 17/176,530, filed Feb. 16, 2021, which is a continuation of U.S. application Ser. No. 16/828,354, filed Mar. 24, 2020, now U.S. Pat. No. 10,924,460, issued Feb. 16, 2021, which claims priority to U.S. Provisional App. No. 62/948,105, filed on Dec. 13, 2019; and is a continuation-in-part of U.S. application Ser. No. 16/828,420, filed on Mar. 24, 2020, which claims priority to U.S. Provisional App. No. 62/948,105, filed on Dec. 13, 2019, the contents of which are incorporated herein by reference.

The present application is a continuation of U.S. patent application Ser. No. 17/743,887, filed May 13, 2022, the contents of which are incorporated herein by reference.

The present application is a continuation of U.S. patent application Ser. No. 17/742,808, filed May 12, 2022, the contents of which are incorporated herein by reference.

TECHNICAL FIELD

The present disclosure generally relates to a method of training recommendation systems from distributed data without harming a user's privacy in their data.

BACKGROUND

The following details are not considered prior art but an introduction and background to the concepts disclosed herein. Most of the existing recommendation systems require the training data to be collected at a centralized location. Recommendation systems can include any type of recommendation such as for product, advertisements, or other actions which consumers are likely to take. Distributed learning methods that try to address this problem are either not efficient or harm the privacy of the users data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1:
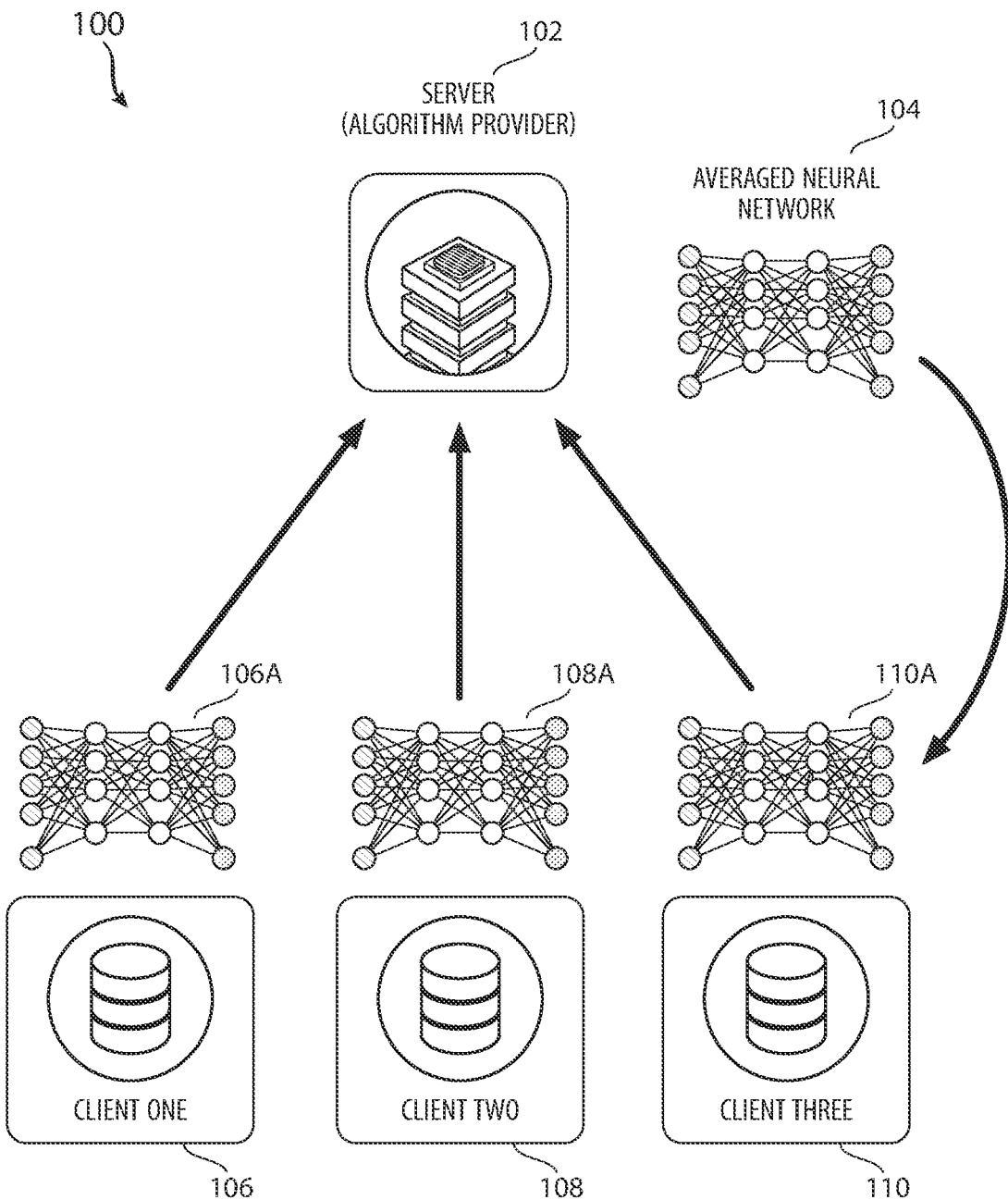
FIG. 1 illustrates a federated learning model training approach.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

As suggested above, with respect to recommendation systems, they typically are centrally trained which means that training data is received and potentially hacked at a server that receives all of the training data. A new method is disclosed to train recommendation systems from distributed data without harming the user's privacy. A collaborative filtering approach is extended to train on decentralized data, utilize stochastic gradient descent for optimization, and secure multi-party compute (MPC) for matrix aggregation.

This disclosure will first discuss some background approaches and then introduce the new approaches. In one aspect, a particular platform is used to enable a federated development or training of neural network models. The use of the disclosed platform for training models in this manner is disclosed as another embodiment herein. In yet another embodiment, data is encrypted as it is passed between a server and one or more client devices. Various types of federated learning (Shown in FIG. 1), split learning (shown in FIG. 2), and split-learning peer-to-peer (Shown in FIG. 3) are disclosed herein. This disclosure describes as background two primary improvements over federated learning and split learning. The first is a blind learning approach (shown in FIGS. 4-5) in which client side processing occurs in parallel and independent of other clients. The second disclosed approach (shown in FIGS. 6-10) relates to a multi-modal artificial intelligence (MMAI) training approach to handle different types of data from different clients. FIGS. 4-13 show background data such as concepts related to blind decorrelation in FIG. 7, related methods and information regarding how to perform processes in a "shared space" in which parties generate "shares" of their data and rather than sharing data with another party, they provide just a "share" of their data that does not reveal anything regarding their data.

Typical federated learning involves passing a whole model from a server to a client device for training using the client data. The process can include using a number of different clients, each with their respective data, for training purposes. The approach typically is performed in a linear and iterative fashion in which the whole model is sent to the first client with data, then after training at the first client, the whole model is received back to the server for "averaging". Then whole updated model is sent to second client with data for additional processing. Then that updated model is sent back to the server for additional "averaging", and so on. In a split learning approach, the model is split and part is sent to each client but there still is a linear and interactive training process that is inefficient. The split-learning peer-to-peer approach also is performed linearly as peer clients share data in the linear process. Improvements in maintaining the privacy of data and efficiency in the training process are needed.

As noted above, a blind learning approach is disclosed as a variation on the typical federated learning approach. A method in this regard includes splitting up, at a server, a neural network into a first portion and a second portion, and sending the second portion separately to a first client and a second client. The clients can have the data (MRIs, patient data, banking data for customers, etc.) and each receive a portion of the neutral network (a certain number of layers of the network up to a cut layer). The method includes performing the following operations until a threshold is met: (1) performing, at the first client and the second client, a forward step on the second portion simultaneously to generate data SA1 and SA2 (See FIGS. 1-4); (2) transmitting, from the first client and the second client, SA1 and SA2 to the server; (3) calculating, at the server, a loss value for the first client and the second client; (4) calculating, at the server, an average loss across the first client and the second client; (5) performing, at the server, backpropagation using the average loss and calculating gradients; and (6) sending, from the server, the gradients to the first client and the second client. This approach provides an improvement over the federated learning approach and the split learning approach by causing the processing on the client side (or the "data server" side) to operate in parallel and independent of each other. This approach also differs from the split learning peer-to-peer approach as well. The independent data servers send their activations up to the server side which aggregates, averages or otherwise processes the data depending on the network requirement to obtain the final trained model.

Another aspect of this disclosure relates to an improvement in developing an artificial intelligence model in which multiple different modes of data or types of data are available to be used for training. For example, different clients might have different types of data. One client might have images of X-rays or MRIs and another client may have text describing a patient's health condition. In this regard, a method can include splitting a neural network into a first client-side network, a second client-side network and a server-side network, sending the first client-side network to a first client. The first client-side network is configured to process first data from the first client, the first data having a first type. The first client-side network can include at least one first client-side layer. The method includes sending the second client-side network to a second client. The second client-side network is configured to process second data from the second client, the second data having a second type. The second client-side network can include at least one second client-side layer, wherein the first type and the second type have a common association.

The method can further include receiving, at the server-side network, first activations from a training of the first client-side network on first data from the first client, receiving, at the server-side network, second activations from a training of the second client-side network on second data from the second client, training at least one server-side layer of the server-side network based on the first activations and the second activations to generate gradients and transmitting the gradients from the server-side network to the first client-side network and the second client-side network. In this manner, multiple different types of data, having a common relationship such as being related to single patient or a single type or category of patient, are used to train the model.

With respect to this present disclosure, the concept of training a recommendation system can include initiating, at a server device, an item-vector matrix V, wherein the item-vector matrix V includes a value m related to a total number of items across one or more client devices and a value d representing a hidden dimension. The method can include transmitting the item-vector matrix V to each client device of a set of client devices, wherein each client device trains a local matrix factorization model using a respective user vector U and the item-vector matrix V to generate a respective set of gradients on each respective client device. The method can further include receiving, via a secure multi-party compute protocol, and from each client device of the set of client devices, the respective set of gradients, updating the item-vector matrix V using the respective set of gradients from each client device to generate an updated item-vector matrix V and downloading the updated item-vector matrix V to at least one client device of the set of client devices. The process can occur both from a server point of view or a client device point of view. Furthermore, the method may also occur from both devices each performing part of the process.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Disclosed herein is a new system, a platform, compute environment, cloud environment, marketplace, or any other characterization of the system that will enable an improved approach for training of inference of decentralized recommendation systems. Some background material is first provided with respect to FIGS. 1-13 which cover features such as federated learning, blind learning and using shares to compare and process data. After these background discussions, the primary focus of this application will be presented in FIGS. 14 and 15A and 15B.

Federated Learning

FIG. 1 illustrates the federated learning approach 100. This is an approach used by major companies now. A downside of this approach is that it proceeds "linearly" to one data provider at a time—rather than in parallel. The example neural network shown is a fully connected feed forward neural network that is being trained using a federated learning approach. The training process in this case includes a server 102 creating a model 104 and sharing the model 106A, 108A and 110A with respective clients 106, 108, 110 in a linear fashion. The clients train the respective model 106A, 108A, 110A separately when they receive the model on their turn and respectively send their trained model data back to the server 102 as shown. The server 102 averages the models and produces a new model 104 with updated weights (a.k.a a trained model). The server 102 sends the new model or weights to the respective clients 106, 108, 110 in a linear fashion. The process is repeated a number of iterations or until a specific accuracy is achieved.

In each iteration, the server 102 averages all participating models to create a trained model B. Thus, the server has a fully-trained model 104 at any point of time. The term "global model" refers to the model that results from the training process. The global model is a trained object that will be used for an inference task. An inference task might be to evaluate a medical image to classify whether the patient has cancer or a broken bone or some other medical condition.

An example of this approach being used, devices such as an electronic watch, or a mobile device, a device charging at night for example, and connected to a Wi-Fi network, could have its processor used to train neural network models. Thus, client 1 (106) could be an Apple watch, client 2 (108) could be another person's iPhone, and so forth. An example of a model is the Siri speech processing service offered by Apple. Every device is training the same model and the only difference is that the respective client is training on the data local to them. The model or data is transmitted back to the server 102 and the server averages the model together. The downside is that respective clients, such as client 1 (106), could be tricked into sharing something about the data being used to train the model. This would be a leakage of privacy data and raise the issued outlined above. The challenge of the federated learning approach is that there is no model privacy as the entire model is passed from client to client. There are high computational costs as each client processes the entire model, and a heavy communication overhead as the entire model is transmitted numerous times. A reconstruction attack can make training data venerable as well.

Split Learning

Figure 2:
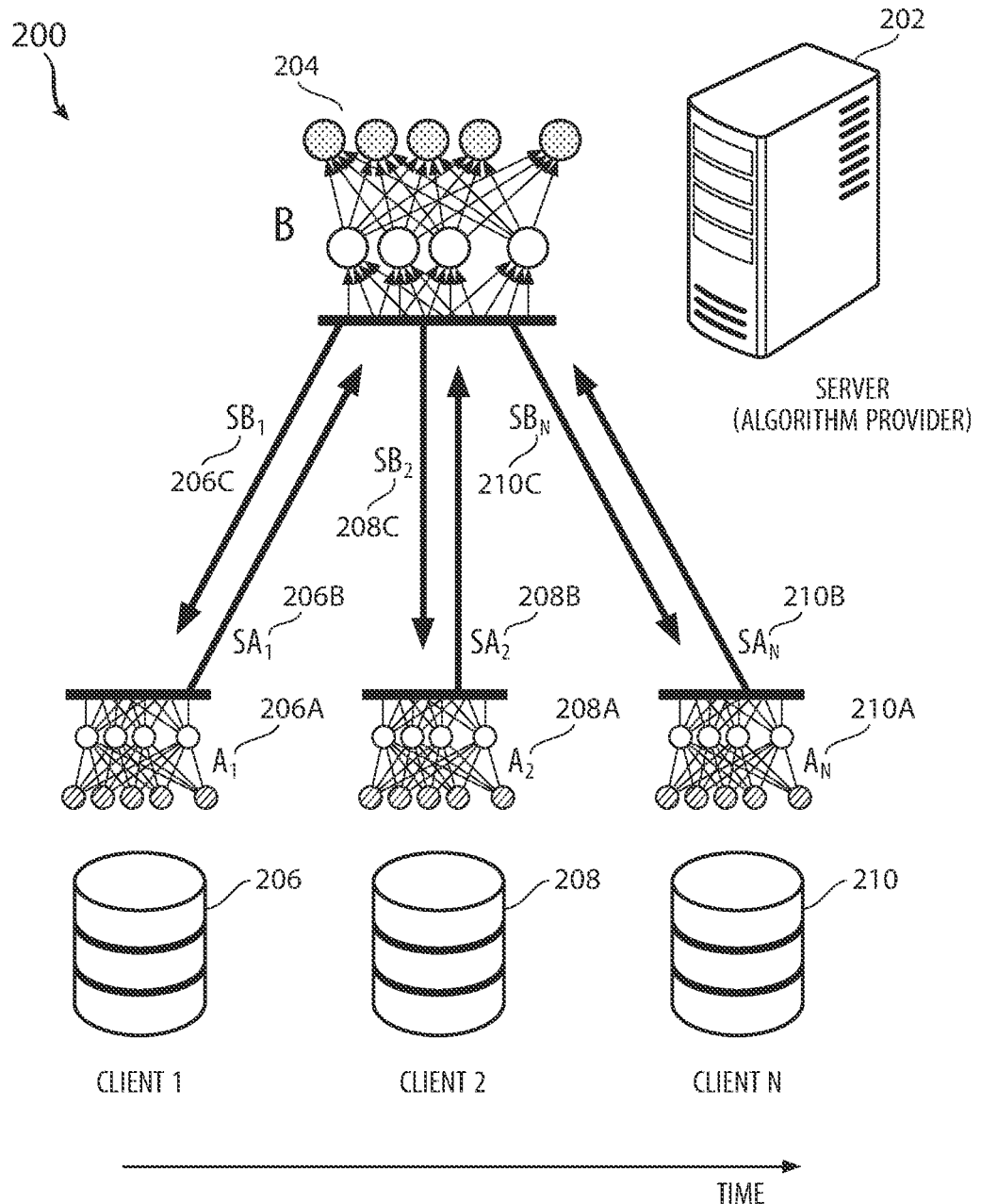
FIG. 2 illustrates a split learning centralized model training approach.

FIG. 2 illustrates a split learning centralized approach. A model (neural network) 204 is split into two parts: one part (206A, 208A, 210A) resides on the respective client side 206, 208, 210 and includes the input layer to the model and optionally other layers up to a cut layer, and the other part (B) resides on the server side 202 and often includes the output layer. Split layer (S) refers to the layer (the cut layer) where A and B are split. In FIG. 2, SA represents a split layer or data sent from A to B and SB represents a split layer sent from B to A.

In one example, the neural network between B 204 and client 1 (206) is the B portion 204 plus the A1 portion (206A) with the communication of data SB1 (206C) and SA1 (206B) to complete the entire neural network. The training process is as follows in this model. The server 202 creates A and B and sends a respective model A (206A, 208A, 210A) to the respective client 206, 208, 210. For every client, the operations include repeating the following in a linear or iterative fashion across the group of clients until some conditions occurs. The respective client 206, 208, 210 on their turn downloads the most recent model A from the server 202 (Note that this step is different between the approach shown in FIG. 2 and FIG. 3). The clients 206, 208, 210 in their respective turn do a forward step on the model A and sends the output of A (i.e., activations at S only or SA1 (206B), SA2 (208B), SAN 210B)) to the server 202 in addition to the required labels. The server 202 does a forward step on B using the SAs received from the respective client 206, 208, 210. The server 202 calculates the loss function and the server 202 does backpropagation and calculates gradients at the S layer. The server 202 sends the gradients of S only (i.e., SB1 (206C), SB2 (208C), SBN (210C)) to the respective client 206, 208, 210. This is process is performed linearly across the different clients such that the operations occur first for client 206, followed by client 208, and then client 210. The client 206, 208, 210 does backpropagation using the SB gradients received from the server 202 and the client 206, 208, 210 shares their updated A (SA1 (206B), SA2 (208B), SAN (210B)) with the server 202.

The horizontal axis in FIG. 2 is time such that the processing occurs in like a round-robin fashion from client to client.

In one example, network A1 206A on client 1 can include a convolution layer and an activation layer. Having processed data, the client 1 (206) sends the result of that layer forward (SA1 (206B)) to the next layer in the network, which is at the server 202, which calculates the backpropagation and so forth as outlined above. The B network repeatedly (in round robin fashion) processes the different data from the different clients 206, 208, 210. It will ultimately arrive at an averaged reflection of the network. It never trains the network on all the data from all the clients 206, 208, 210 at the same time. It can process data faster and have a benefit of B being averaged across the data as it is built. The final algorithm has not seen all the data. The model B cannot be tricked into revealing its data as it has never been trained on all of the data.

Split Learning in a Peer-to-Peer Environment

Figure 3:
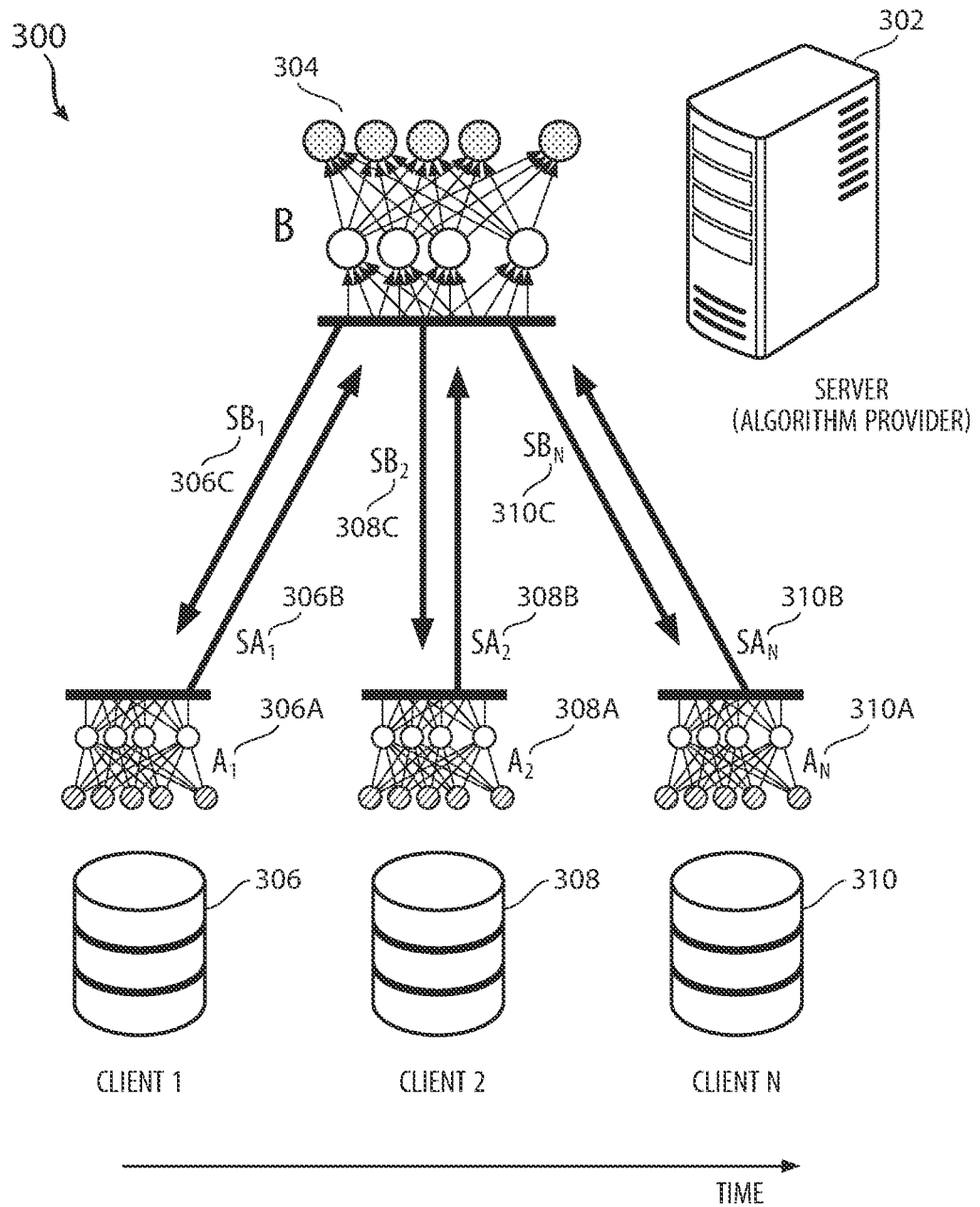
FIG. 3 illustrates a split learning peer-to-peer approach.

FIG. 3 illustrates a split learning peer-to-peer approach. A model (neural network) is split into two parts: one part (A) resides on the client side and includes the input layer, and the other part (B) resides on the server side and often includes the output layer. In FIG. 3, the client side part (A) is shown respectively as A1 (306A) at client 306, A2 (308A) at client 308, AN (310A) at client 310. A split layer (S) refers to the layer where A and B are split. In FIG. 3, SA represents a split layer sent from A to B and SB represents a split layer sent from B to A.

In one example, the neural network between B and client 1 306 is the B portion plus the A1 portion 306A with the communication of data SB1 306C and SA1 306B to complete the entire neural network. The training process is as follows in this model. The server 302 creates A and B and sends A to the clients 306, 308, 310. For every client, the process includes repeating the following until some conditions occurs. First, the process includes downloading the most recent A from a previous client.

Note that this step is different between the approach shown in other figures. The process then includes performing a forward step on A and sending the output of A (i.e., activations at S only) to the server 302 in addition to the required labels. The server 302 performs a forward step on B using the SA received from the respective client 306, 308, 310. The server 302 calculates a loss function and performs a backpropagation and calculates gradients at S. The server 302 sends the gradients of S only (i.e., SB) to the respective clients 306, 308, 310. The client does backpropagation using the SB gradients received from the server 302. The client shares their updated A with the server 302.

The peer-to-peer approach generally involves the respective client updating its A model by directly downloading it from a last trained client, or more broadly, by a previously trained client. In this regard, the process of training clients can occur in a round-robin fashion where the clients are trained sequentially. For example, if client 1 306 gets trained first, then in a peer-to-peer model, rather than client 2 308 updating its client-side model A2 from the server 302 or another trusted server, client 2 308 updates its client model A2 by downloaded the client side model A1 from client 1 306. The previously trained model can be the last trained client model or it could be a model from some other previously trained client based on some criteria. For example, client 1 306 and client 2 308 may have their respective models trained. Client 3 310 needs a client-side model update and might implement an algorithm or process to determine which client-side model to download between client 1 306 and client 2 308. Note that the disclosure below implements a multi-model artificial intelligence training process that could apply here. If client 1 306 processes images and its model A1 focuses on image processing, and client 2 308 processes text and its model A2 focuses on text processing, and client 3 310 processes images, then the algorithm or process could cause, in a peer-to-peer environment, the downloading of the client side model A1 to the client 3 310 as its update.

In one scenario, there is not enough information from split learning to achieve proper training of the neural network. It is assumed in this model that a good training approach could be that A and B are aggregated at the server 302 in plain text by simply stacking them (A and B).

Blind Learning

Figure 4:
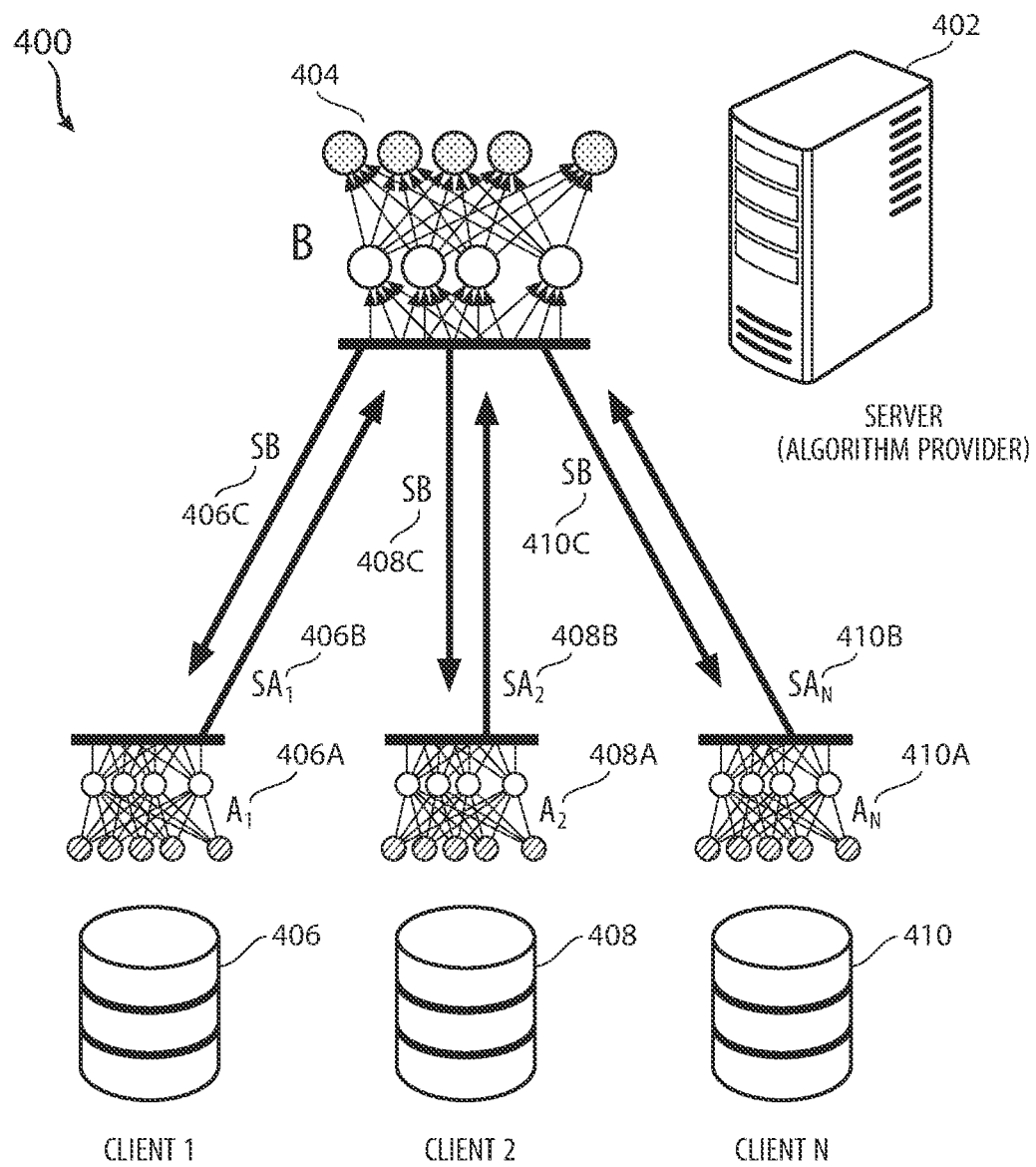
FIG. 4 illustrates a blind learning approach.

FIG. 4 illustrates the improvement to training neural networks disclosed herein. This improvement can be characterized as a blind learning approach and addresses some of the deficiencies of the approaches disclosed above. FIG. 4 introduces a parallel processing approach. The parallel and independent processing causes the model training to occur at a faster pace than the other models described above.

The blind learning approach does not perform the round robin processing described above. The server 402 splits the network at the "split layer" which is a user parameter inserted into the network definition codes. The "top portion" of the network is kept at the server 402 the "bottom portion" is sent to the respective data providers or clients 406, 408, 410 (the terms clients and data providers are used interchangeably here). The training starts at the very lowest network layer which is the layer closest to the data. Each layer reads either the data (from the first layer) or the output of the previous layer (all other layers).

The layers can calculate their output (these are termed "activations" because they come from an activation function) based on any valid network architecture command (convolutions, dropouts, batch normalization, flatten layers, etc.) and activation function (relu, tanh, etc.). When the last layer on the data side 406, 408, 410 has calculated its appropriate activations (i.e., output) those outputs are sent to the first layer on "the other side of the split"—the first layer on the server side 402.

The following approach involves splitting the model up as before. A model is split into two parts: (A) on the client side and includes the input layer, and (B) on the server side and often includes the output layer. (S) is the split layer. The clients or data providers 406, 408, 410 run independently and send back the answer if they have it. The code on the server 402 processes the data and sends back its output equally to all the clients as SB (406C, 408C, 410C).

An example training process is as follows. The server 402 creates A and B and sends the portion A (406A, 408A, 410A) to the clients 406, 408, 410. The following steps are repeated until a condition is met (e.g., accuracy). All the clients 406, 408, 410 do the forward step on A simultaneously. Up to this point, all the calculations on the clients 406, 408, 410, are being done on independent servers and there is no dependency from one data server to the other. This approach highlights a one of the innovations disclosed herein. All these calculations by the clients/data providers 406, 408, 410 can all operate in parallel, at the same time. This is in contrast to the linear or "round robin" fashion discussed above.

The clients 406, 408, 410 each run their portion A (406A, 408A, 410A) of the neural network and generate a respective output of A (i.e., SA (406B, 408B, 410B) and send the output to the server 402. The server 402 receives 3 different 'versions' of the activations (one from each of SA1, SA2, SA3). At this point, the server 402 processes those activations "appropriately", which can mean that the server 402 does different operations depending on the case. For example, the server 402 calculates the loss value for each client 406, 408, 410 and the server 402 calculates the average loss across all clients. The server 402 performs backpropagation using the average loss and calculates gradients at S. Another example includes the server 402 stacking all received sets of activations from each client 406, 408, 410, generating a global single batch of activations, which is then used by the server 402 to calculate the average loss. The server 402 performs backpropagation using the average loss and calculates gradients at S. The server 402 sends gradients at S (i.e., SB (406C, 408C, 410C)) to all the clients 406, 408, 410.

In other words, training on the server side 402 proceeds much like is described above. Once the first layer on the server side 402 is "complete" (either through averaging or aggregating what is received from the data providers 406, 408, 410) forward propagation occurs until the "top" of the network is reached. An additional innovation described in this disclosure is in the management of the activations coming from the data providers 406, 408, 410 and how they get averaged, aggregated or some other treatment. Once the system arrives at the top of the model, the server 402 calculates the gradients necessary for back propagation, and sends them back down and across the split networks as shown in FIG. 4.

As noted above, the processing and the management of the activations by the server 402 can vary depending on different factors. For example, assume a case where all three data providers 406, 408, 410 are supplying the same data (X-rays). In that case, the data will be combined horizontally which can conceptually mean that the data is "stacked" one file on top of the other. In this case, the activations that come up will most likely be averaged. The "average of each activation" will then be sent forward into the "top half" of the network.

In a different case, the data can be "vertically" stacked, so Client 1 406 has the first 40 columns of data (say a blood test), Client 2 408 has the next 60 columns of data (say an Electronic Health record that includes data such as age, weight, etc.) and Client 3 410 has the last 100 columns of data (say insurance information—previous claims, etc.). In this instance, the three clients can be considered as establishing a combined "record" of 200 columns (aggregated vertically across the page). In this case, the activations will be "combined vertically" and sent forward into the server network. This and other approaches to combining data can be implemented. Note that the multi-model artificial intelligence model described more fully below builds upon the concept just described with respect to combining vertically the activations. More details will be provided below on this concept.

As noted above, the clients 406, 408, 410 run in parallel in this embodiment. This reduces the time it takes to train the model—as all the processing is done in parallel. Further, this data is delivered over a particular platform. The applications incorporated above provide examples of the particular platform that can be used to deliver the data as disclosed herein. This will be discussed more below.

A global model in blind learning can be aggregated as follows. After the training is done, the system uses on the following approach to aggregate a global model, which will be used for the inference task. In a first approach, the server selects one of the models, Ai, to be aggregated with its model, B, to form the global model. The selection of Ai could be achieved using one of the following ways. For example, random selection could be used where the server selects a model (Ai) of any client 406, 408, 410 randomly. This random selection might be influenced by other factors, such as the currently available clients online, the types of data each client processes (text data, image data, temporal data) or based on the transmission speed or network delay between the two entities. The server then stacks both parts Ai and B to generate the global model.

In another example, a weighted client selection could be used. For this selection criteria, the server 402 assigns each client a weight (i.e., a numerical value) that reflects their importance based on their data, computational powers, and other valuable assets they possess and contribute during the training process. For example, a particular model set (say data for a certain language, data associated with a type of image, data associated with a patient set, or data from a particular country or region) could get weighted heavily in the model development. Thus, if a country is selected, then the client devices from that country can be weighted more heavily than clients from other countries. Japanese-based client devices can be used for 80% of the model data, for example. Australia could be 10% and Canada could be the other 10%. In another example, data from a certain clinic associated with an outbreak of the flu or COVID could be weighted more heavily. In yet another example, the type of data might be weighted more heavily as well. Image data may be used for 70% of a model, while textual data for 20% and temporal data for 10%.

Yet another model could be an accuracy-based selection. In this case, the server 402 can test the accuracy generated from each client model Ai and then select the model that generates the "best" accuracy. The "best" can be identified by stakeholders, through a machine learning approach, or otherwise. These are all models of the first approach.

A second approach can be where the global model is aggregated by averaging all clients' models Ai {1, N}. Each client first encrypts their model using homomorphic encryption and then sends the encrypted Ai' data to the server 402. The server 402 adds all the encrypted models, decrypts the addition results, and then calculates their average. The averaged A is then stacked with B to generate a global model. One approach could be a default approach, and optional approaches could be provided as well. The decryption processes and averaging process could also be spread between different servers, for example, with one process occurring on the client side and another process being performed by the server 402 to achieve the global model.

The approaches may vary through the development of the model. For example, the model may begin to be trained using a default approach and then the training could be adjusted such that a weighted approach is used to complete the model training.

Figure 5:
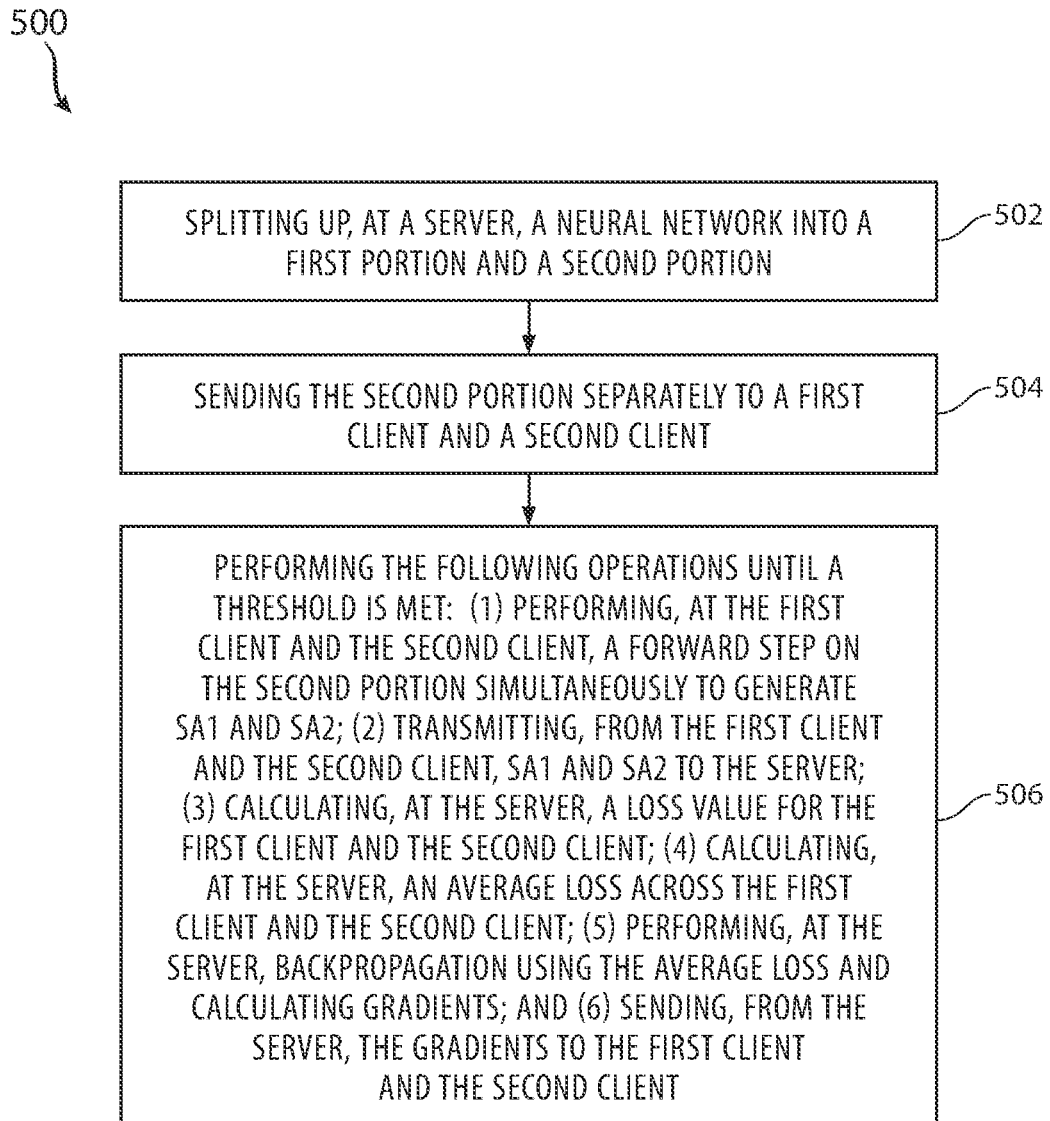
FIG. 5 illustrates an embodiment related to blind learning.

A method example is shown in FIG. 5 and can include splitting up, at a server, a neural network into a first portion and a second portion (502), sending the second portion separately to a first client and a second client (504) and performing the following operations until a threshold is met:

(1) performing, at the first client and the second client, a forward step on the second portion simultaneously to generate data SA1 and SA2;

(2) transmitting, from the first client and the second client, SA1 and SA2 to the server;

(3) calculating, at the server, a loss value for the first client and the second client;

(4) calculating, at the server, an average loss across the first client and the second client;

(5) performing, at the server, backpropagation using the average loss and calculating gradients; and (6) sending, from the server, the gradients to the first client and the second client (506).

A computing device or devices performing the above operations can also be covered as well as a computer-readable storage device storing instructions which, when executed, cause the processor to perform these operations. The operations can be performed in any order and the method can include one or more of the operations.

In another aspect of this disclosure, the platforms described in the patent applications incorporated above can provide the basis for communicating data back and forth in any of the federated models. For example, each of the clients and/or the server as well may be required to be logged onto a platform or one of the versions of the platform referenced in the applications incorporated herein. Therefore, delivering this functionality over a platform or an exchange configured as disclosed in these applications is also covered as an aspect of this disclosure.

In another aspect, a customer could chose SA, SB lines (vectors and numbers) which represent weights that need to be propagated. If a client wanted their data to be locked down without the server knowing anything about the data, that data can be homomorphically encrypted. The encryption process (which can include any encryption process) could be used in any approach disclosed above.

The incorporated patent applications above provide example platforms that client devices and/or servers can log into or may be required to be logged into in order to perform the blind learning approach disclosed herein.

It is noted that in one aspect, the steps disclosed herein can be practiced by a "system." The system can include the server and one or more clients together, or might just be functionality performed by the server. The system could also be a client or a group of clients, such as clients in a particular geographic area or clients groups in some manner that are performing the client-based functions disclosed herein. In one aspect, the "server" can also be a computing device (physical or virtual) on the server side as well as a computing device (physical or virtual) on the client side. In one example, a server can be on the client side and can receive back-propagation output of the respective client side models Ai and can synchronize a client-side global model in a round of training.

Thus, each of the server side system and the client side system can perform any one or more of the operations disclosed herein. Claims can be included which outline the steps that occur from the standpoint of any device disclosed herein. For example, the steps of transmission, calculation, and receiving of data can be claimed from the standpoint of a server device, a client device, or group of client devices depending on which embodiment is being covered. All such communication from the standpoint of an individual component or device can be included as within the scope of a particular embodiment focusing on that device.

In another aspect, the system can include a platform as disclosed in the patent applications incorporated by reference also performing steps in coordination with the concept disclosed above. Therefore, the platform as used to provide the blind learning process described herein is also an embodiment of this disclosure and steps can be recited in connection with the use of that platform for training models in a manner that maintains privacy of the data as described herein.

Typically the training of a neural network is performed on similar data types. For example, a neural network trained to identify cancer by receiving a patient image or a kidney is trained on images of kidneys that are and are not cancerous. Next is discussed a new approach to training which uses different types of training data together to train a neural network, using the blind learning approaches disclosed herein.

Multi-Model Artificial Intelligence Approach

As mentioned above, the MMAI innovation builds on the "vertical aggregation" idea described in an example of blind learning. The example related to all three clients 406, 408, 410 providing the same type of data—either images (for stacking) or tabular data to be combined vertically. When the inventors were considering the vertical aggregation concept, they realized that this could be done with different types of data. For example, Client 1 could provide images, Client 2 could provide a blood test, and Client 3 could provide doctors textual notes. The significant difference is all of those data types require different network architectures. In this case, the developers of the system can't define one network and then let the server "split" it. Thus, part of the solution is to let the users define the network "before the split" for each data provider, and then define the network and aggregation technique on the server. This approach is illustrated in FIGS. 6-10.

Figure 6:
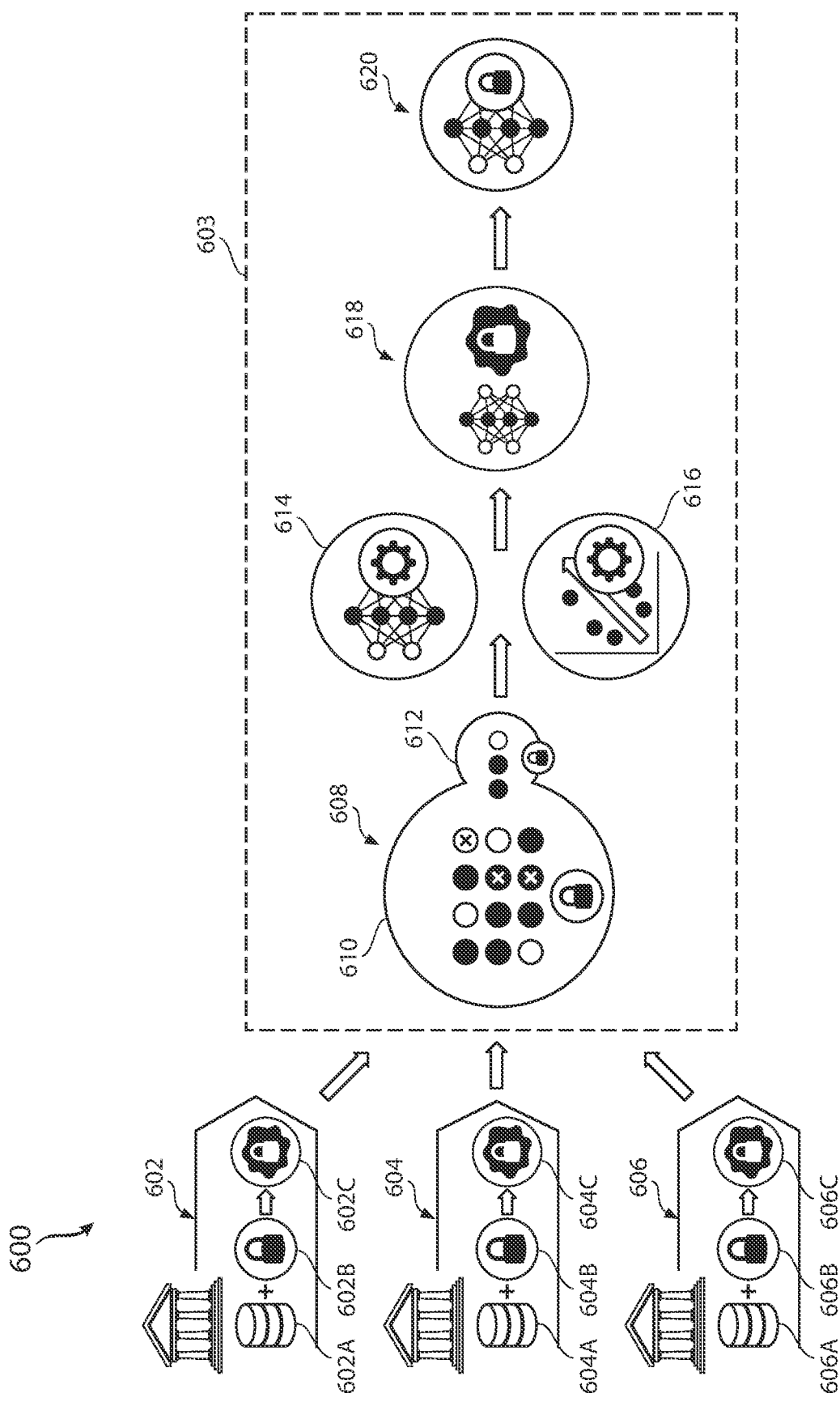

FIG. 6 illustrates the multi-modal artificial intelligence (MMAI) platform or a machine learning (ML) platform 600. The MMAI approach reduces the computational requirements and communication overhead of other approaches. Additionally, the training speed is much faster and the process maintains a much higher privacy in the data, including the fact that the model stays private as well.

The MMAI platform 600 applies AI/ML techniques to multiple data types in one large AI model. Typically, different data types require different AI network architectures to yield accurate results. Images, for example, typically require special filters (convolutions), whereas text or speech require different "time series-like" treatment, and tabular data frequently works best with ML or feed forward architectures. The issue is that images are best understood by looking at all of the pixels together and "convoluting" them in various ways, whereas speech is best understood in the context of what came before and/or after a certain sound (i.e. in a manner similar to time-series data), etc. Because of these differences in processing, "state of the art" systems today typically process one data type (i.e. images, text, speech, tabular, etc.).

Most AI researchers recognize that breakthroughs in "next generation" accuracy can be achieved by adding more unique data to their models. This is essentially the equivalent to providing more data to the model to give it more context with which to discover interesting differences in cases. An example of this concept is a model that diagnoses Atrial Fibrillation (A-fib) by examining ECG (electro-cardiogram) data. The model can reach a certain level of accuracy based on the ECG data alone, but when the researchers add age, sex, height and weight to the ECG data, the model becomes far more accurate. The increase in accuracy is due to the four additional data types being able to help the model better understand what would otherwise look to the model like "equivalent" ECGs. Adding the four items or characterizations of the data can make the data more granular.

The MMAI platform 600 shown in FIG. 6 introduces a new generation cryopgraphy toolset to improve the training and protection of private data. The MMAI platform 600 provides the model with more data than is typically used to train AI/ML models and expands on the data. The approach adds a significant amount of data by combining different data types—i.e. images and tabular data, for instance.

FIG. 6 illustrates a first outside source of data 602, which is shown as Wells Fargo bank. The Wells Fargo data 602a is encrypted 602b and the package of encrypted data 602c is transmitted to a private AI infrastructure 603. A second outside source of data 604 is shown as Citibank. The Citibank data 604a is encrypted 604b and the package of encrypted data 604c is transmitted to the private AI infrastructure 603. A third outside source of data 606 is shown as from Bank of America. The Bank of America data 606a is encrypted 606b and the package of encrypted data 606c is transmitted to the private AI infrastructure 603. The AI infrastructure 603 includes a first module 608 that will privately explore, select and preprocess all of the data 610 from the disparate sources 602, 604, 606. In this example, all of the sources are identified as banks but they will have different structures for their data, and the respective data can be disparate as well. Of course, it is not a requirement that all of the outside sources 602, 604, 606 of data be of the same type, i.e., banks. The use of banks is just an example. The outside sources 602, 604, 606 could be, for example, a hospital, a clinic, a university, and so forth. The basic concept is that the data types can be different from the various different outside sources 602, 604, 606.

The private AI infrastructure 603 can include a component that privately explores, selects and preprocesses the relevant features from all of the data 602c, 604c, 606c it receives for training. Feature 612 represents the subset of the data 610 which can result from the processing of the component in the private AI infrastructure 603. In operations 614, 616, the AI infrastructure 603 privately trains new deep and statistical models on the selected data 612 and in operation 618 will predict on any private and sensitive data, which can include images, video, text and/or other data types. The AI infrastructure 603 can then sell or grant access to the new models which is presented in operation 620.

Figure 7:
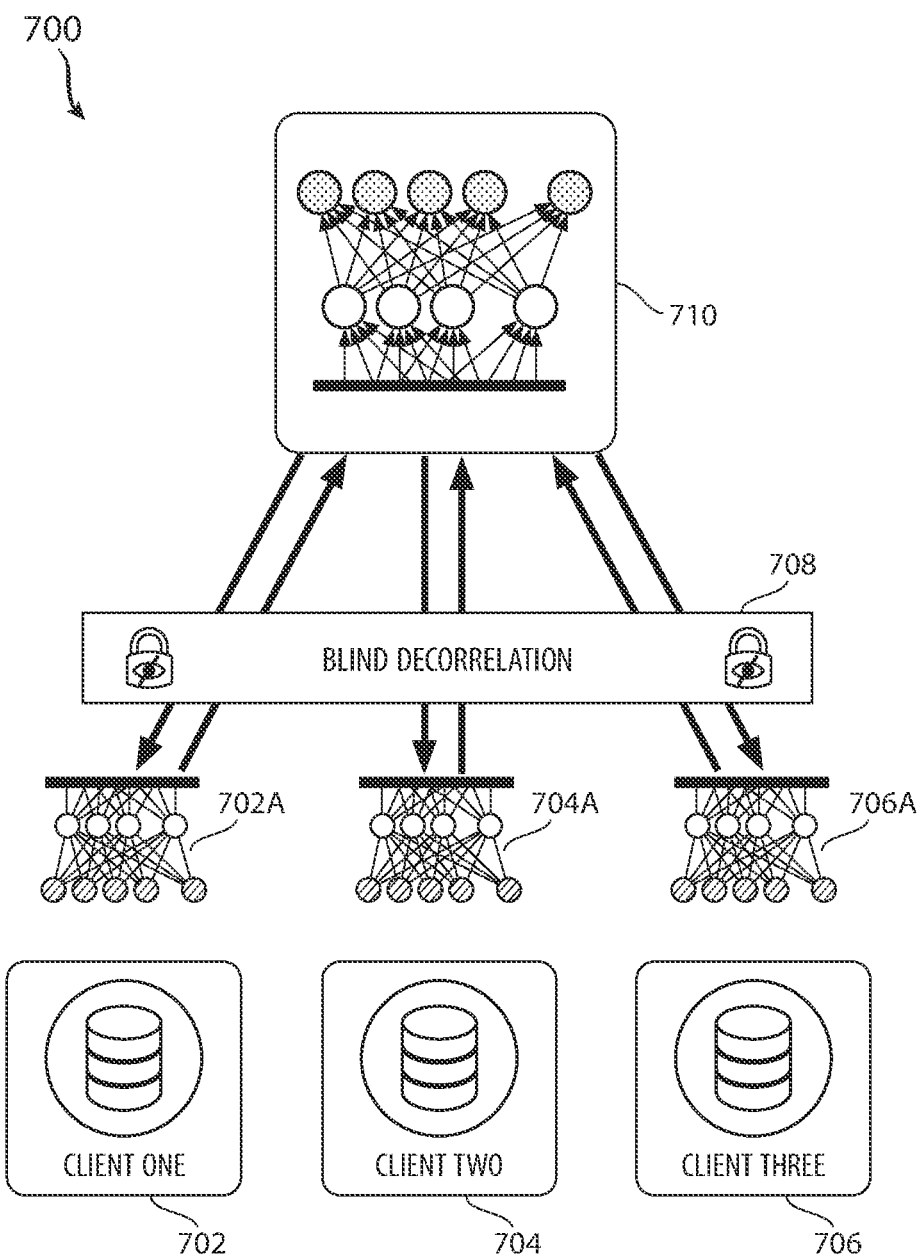
FIG. 7 illustrates how blind decorrelation works across multiple clients.

FIG. 7 illustrates another variation on the split learning technique 700. This approach provides low compute requirements and low communication overhead to improve the training of models by using a blind decorrelation process for training based on disparate types of data. Building on the A-fib model example above, another source of even more data for the model would be to include a chest X-ray for each case the model considers. Unfortunately, the typical processing of the X-ray image is not consistent with the typical processing of the tabular ECG data. With a few minor engineering additions, the above-disclosed split-federated learning tool can be used to address this incompatibility problem. Namely, new instructions can be provided to the tool to allow different data types to process in the existing pipeline.

In this case rather than an "automatic" split of the network architecture this variation on the idea allows the network architect (i.e. the data scientist developing the algorithm) to specify the specific network components desired for each data type. Each data type will need network architecture layers relevant to its data type (i.e. convolutional layers for images, Recurrent layers/Long Short Term Memory layers for speech, feed forward layers for tabular data, etc.). These disparate layers, each specific to the data type in question, will be specified such that they run on the "data server" side (almost like independent networks in and of themselves). The last layer of each "independent network" (per data type) will send it's activations "across the split" to the "server side". The algorithm server side will have one consistent "network" that processes the incoming activations (from the data server side) appropriately. In some respects this approach is similar to an "ensemble of networks" (on the data server side) being aggregated into one final network on the algorithm server side (which ultimately produces the final "answer" from the "ensemble" of networks).

Split learning is a collaborative deep learning technique, where a deep learning network or neural network (NN) can be split into two portions, a client-side network A and a server-side network B, as discussed above. The NN includes weights, bias, and hyperparameters. In FIG. 7, the clients 702, 704, 706, where the data reside, commit only to the client-side portion of the network, and the server 710 commits only to the server-side portion of the network. The client-side and server-side portions collectively form the full network NN.

The training of the network is done by a sequence of distributed training processes. The forward propagation and the back-propagation can take place as follows. With the raw data, a client (say client 702) trains the client-side network 702A up to a certain layer of the network, which can be called the cut layer or the split layer, and sends the activations of the cut layer to the server 710. The server 710 trains the remaining layers of the NN with the activations that it received from the client 702. This completes a single forward propagation step. A similar process occurs in parallel for the second client 704 and its client side network 704A and its data and generated activations which are transmitted to the server 710. A further similar process occurs in parallel for the third client 706 and its client side network 706A and its data and generated activations which are transmitted to the server 710.

Next, the server 710 carries out the back-propagation up to the cut layer and sends the gradients of the activations to the respective clients 702, 704, 706. With the gradients, each respective client 702, 704, 706 performs back-propagation on the remaining network 702A, 704A, 706A. This completes a single pass of the back-propagation between a client 702, 704, 706 and the server 710.

This process of forward propagation and back-propagation continues until the network gets trained with all the available clients 702, 704, 706 and reaches its convergence. In split learning, the architectural configurations are assumed to be conducted by a trusted party that has direct access to the main server 710. This authorized party selects the ML model (based on the application) and network splitting (finding the cut layer) at the beginning of the learning.

As noted above, a concept introduced in this disclosure relates to the clients 702, 704, 706 each providing a different type of data but also where the different types of data have a common association. Thus, the selection of the machine learning model can be based on the types of data that are being processed on the client side, and the process of finding the cut layer can also depend on what types of data or the disparity in the different types of data. For example, for widely disparate data types across the clients 702, 704, 706, the cut layer may be chosen to have more or less layers on the client-side networks 702A, 704A, 706A. In another aspect, the number of layers before the cut layer or split layer may vary across clients. Client 702 may be processing images and require 8 layers before the cut layer, while client 704 may process text and only need 4 layers before the cut layer. In this regard, as long as the vectors, activations or activation layer at the cut layer is consistent across the different clients 702, 704, 706 having different types of data, there is no requirement that the number of layers at the client-side networks 702A, 704A, 706A be the same.

The synchronization of the learning process with multiple clients 702, 704, 706 can be done either in centralized mode or peer-to-peer mode. In the centralized mode, before starting training with the server 710, a client 702, 704, 706 updates its client-side model 702A, 704A, 706A by downloading the model parameters from a trusted third-party server 710, which retains the updated client-side model uploaded by the last trained client. On the other hand, in peer-to-peer mode, the client 702, 704, 706 updates its client-side model by directly downloading it from the last trained client. As noted above, previously-trained models may have a data type similarity to a current client that needs to update its model. For example, the similarity may be based on the data be images, textual data, speech data, video data, temporal data, and so forth. Thus, there may be an intelligent selection of which previously-trained client model to use to download from a peer. The processing by the server 710 can also be split in some cases between some processing on the server side and other processing at a federated server on the client side.

As introduced above, client one 702, client two 704 and client three 706 could have different data types. The server 710 will create two parts of the network and sends one part 702A, 704A, 706A to all the clients 702, 704, 706. The system repeats certain steps until an accuracy condition or other condition is met, such as all the clients sending data to the part of the network that they have, and sends the output to the server 710. The server 710 calculates the loss value for each client and the average loss across all the clients. The server 710 can update its model using a weighted average of the gradients that it computes during back-propagation and sends the gradients back to all the clients 702, 704, 706. The clients 702, 704, 706 receives the gradients from the server 710 and each client 702, 704, 706 performs the back-propagation on their client-side network 702A, 704A, 706A and computes the respective gradients for each client-side-network 702A, 704A, 706A. The respective gradients from the client-side networks 702A, 704A, 706A can then be transmitted back to the server 710 which conducts an averaging of the client-side updates and sends the global result back to all the clients 702, 704, 706.

It is noted that the server 710 functionality can be also broken into several servers that each perform the different operations (such as updating its model by one server and averaging the local client updates by another server, each located in different areas). In the case of FIG. 7, the clients 702, 704, 706 all process disparate types of data which normally would or could not be processed to develop an AI model.

For example purposes, the A-fib model from above can be used to illustrate the process. Client one 702 could have ECG data, client two 704 could have X-ray data, and client three 706 could have genetic data. Client one 702, for example, could be a hospital, client two 704 could be a medical diagnostics imaging company and client three 706 could be a bank or financial institution, in a manner depicted in FIG. 6. One of the clients could also have time-based data such as progressive information about the patient relative to weekly visits to the hospital for checkups.

The approach shown in FIG. 7 illustrates how the system can implement new user instructions that allow a user to bring different data types together with the "correct" processing before the split or cut layer or as shown in the blind decorrelation block 708. Each of those parts of the model can be independent, and will operate independently. In one aspect, the processing performed by the blind decorrelation block 708 will result in an activation layer or activations that are transferred to the server 710. This approach is similar to the approach described above with the addition of the differences in data type amongst the clients 702, 704, 706.

The server 710 will combine those activation layers in one of a multitude of ways. The server 710 can average them (which is also described above), but it could also concatenate them into one long activation layer. In another aspect, the server 710 could apply any mathematical function to achieve the desired combination of the activation layers. The server 710 can then process the combined activation layers further using any appropriate network architecture. In one aspect, a server on the client side can receive gradients and average the gradients to generate a global model of the various clients 702, 704, 706 and send the global model to the server 710 for concatenation or for further processing.

The ideas shown in FIGS. 6 and 7 represent an expansion and application of the split-federated learning tool set and provides a platform of off-the-shelf tools to bring disparate data types together into a superset AI model. The processing can be done all privately and the offering can also be included in a marketplace as described in the incorporated patent applications referenced above.

Not only can the system combine different data types, but the system can also combine different AI/ML techniques. For example, client one 702 can be a CNN (convolutional neural network), client two 704 can be an ML routine (i.e. XGBoost), and client 3 706 can apply a different technique as well. In this regard, although the different AI/ML techniques are different, as long as the resulting data at the cut layer is consistent and properly configured, the forward propagation and back propagation can occur and the models can be trained.

In order to assist one of skill in the art to understand how the MMAI approach might work, the following is an example of actual commands per data type coming from the three data providers 702, 704, 706. This code uses the python numbering convention so it starts with builder0 (tabular data from data provider 1 702). Builder1 in this example is for a CT Scan or image data. The commands would be similar for Xray, MRI, and/or any other picture. Builder2 (from data provider 704) is text data. Note the "lstm" command, which is short for "long/short term memory". The "server" builder commands define the network that aggregates the other three at the "top" on the other side of the split.

builder0=tb.NetworkBuilder( )
builder0.add_dense_layer(100, 120)
builder0.add_relu( )
builder0.add_dense_layer(120, 160)
builder0.add_relu( )
builder0.add_dropout(0.25)
builder0.add_dense_layer(160, 200)
builder0.add_relu( )
builder0.add_split( )
builder1=tb.NetworkBuilder( )
builder1.add_conv2d_layer(1, 32, 3, 1)
builder1.add_batchnorm2d(32)
builder1.add_relu( )
builder1.add_max_pool2d_layer(2, 2)
builder1.add_conv2d_layer(32, 64, 3, 1)
builder1.add_batchnorm2d(64)
builder1.add_relu( )
builder1.add_max_pool2d_layer(2, 2)
builder1.add_flatten_layer( )
builder1.add_split( )
builder2=tb.NetworkBuilder( )
builder2.add_Istm_layer(39, 100, batch_first-True)
builder2.add_dense_layer(100, 39)
builder2.add_split( )
server_builder=tb.NetworkBuilder( )
server_builder.add_dense_layer(60000, 8000),
server_builder.add_relu( )
server_builder.add_dense_layer(8000, 1000),
server_builder.add_relu( )
server_builder.add_dense_layer(1000, 128),
server_builder.add_relu( )
server_builder.add_dense_layer(128, 1)

Figure 8:
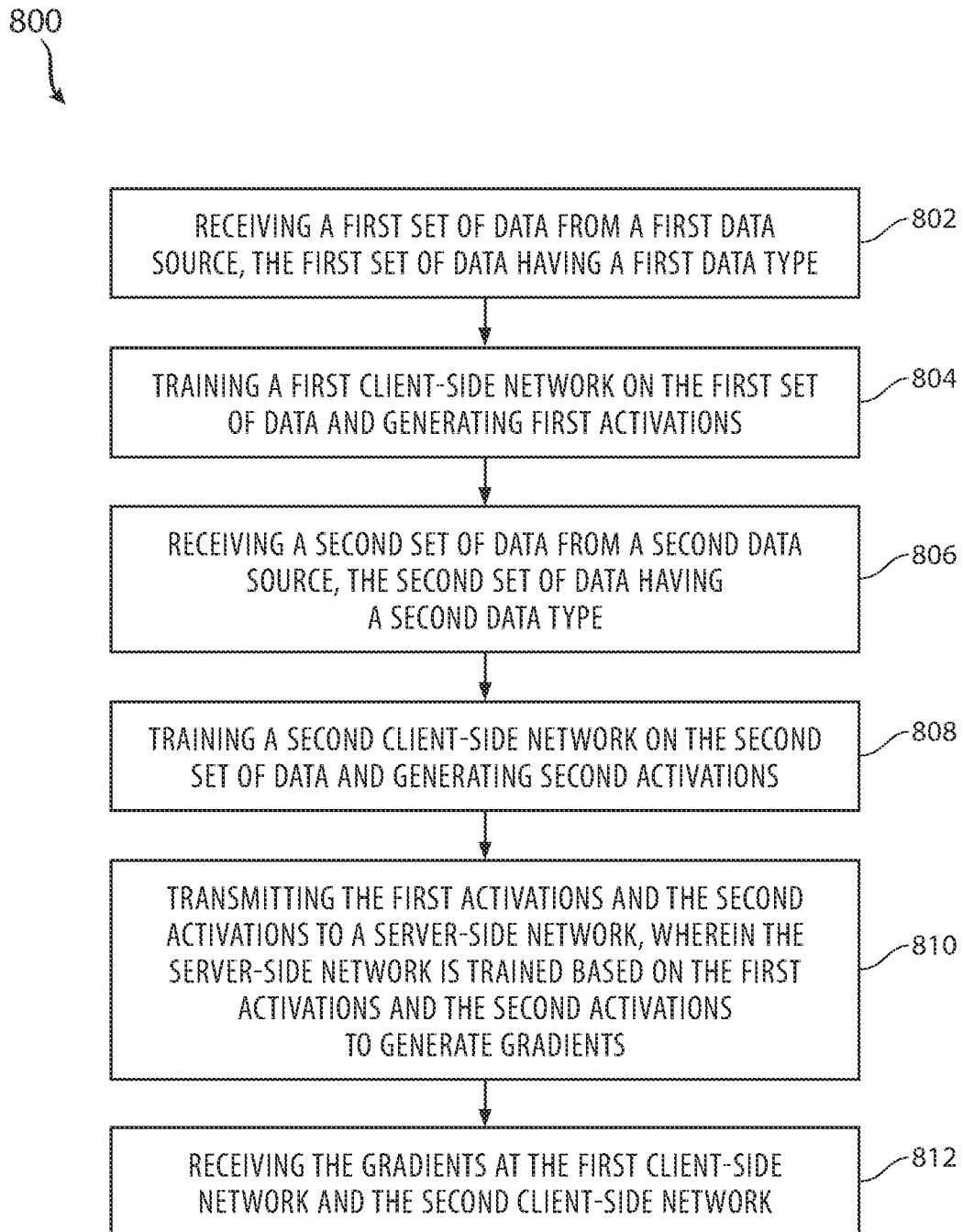
FIG. 8 illustrates a method embodiment.

FIG. 8 illustrate an example method 800 for providing a MMAI concept from the standpoint of the clients. The method includes receiving a first set of data from a first data source, the first set of data having a first data type (802), training a first client-side network on the first set of data and generating first activations (804), receiving a second set of data from a second data source, the second set of data having a second data type (806) and training a second client-side network on the second set of data and generating second activations (808).

The method can further include transmitting the first activations and the second activations to a server-side network, wherein the server-side network is trained based on the first activations and the second activations to generate gradients (810), and receiving the gradients at the first client-side network and the second client-side network (812). The first data type and the second data type can be different data types, such as one being image-based and the other being textual or temporally based as in speech.

Figure 9:
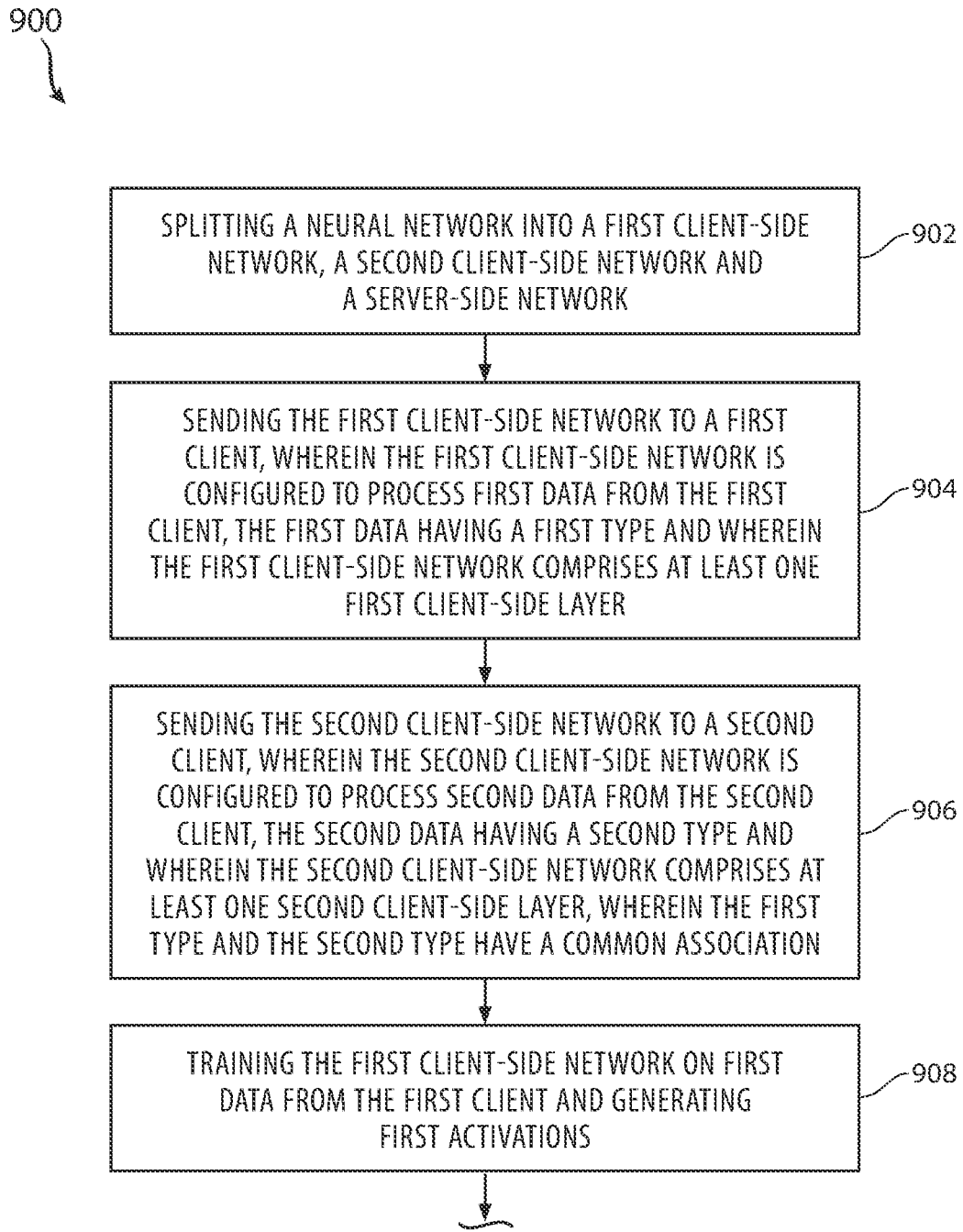
FIG. 9 illustrates a method embodiment.
Figure 9:
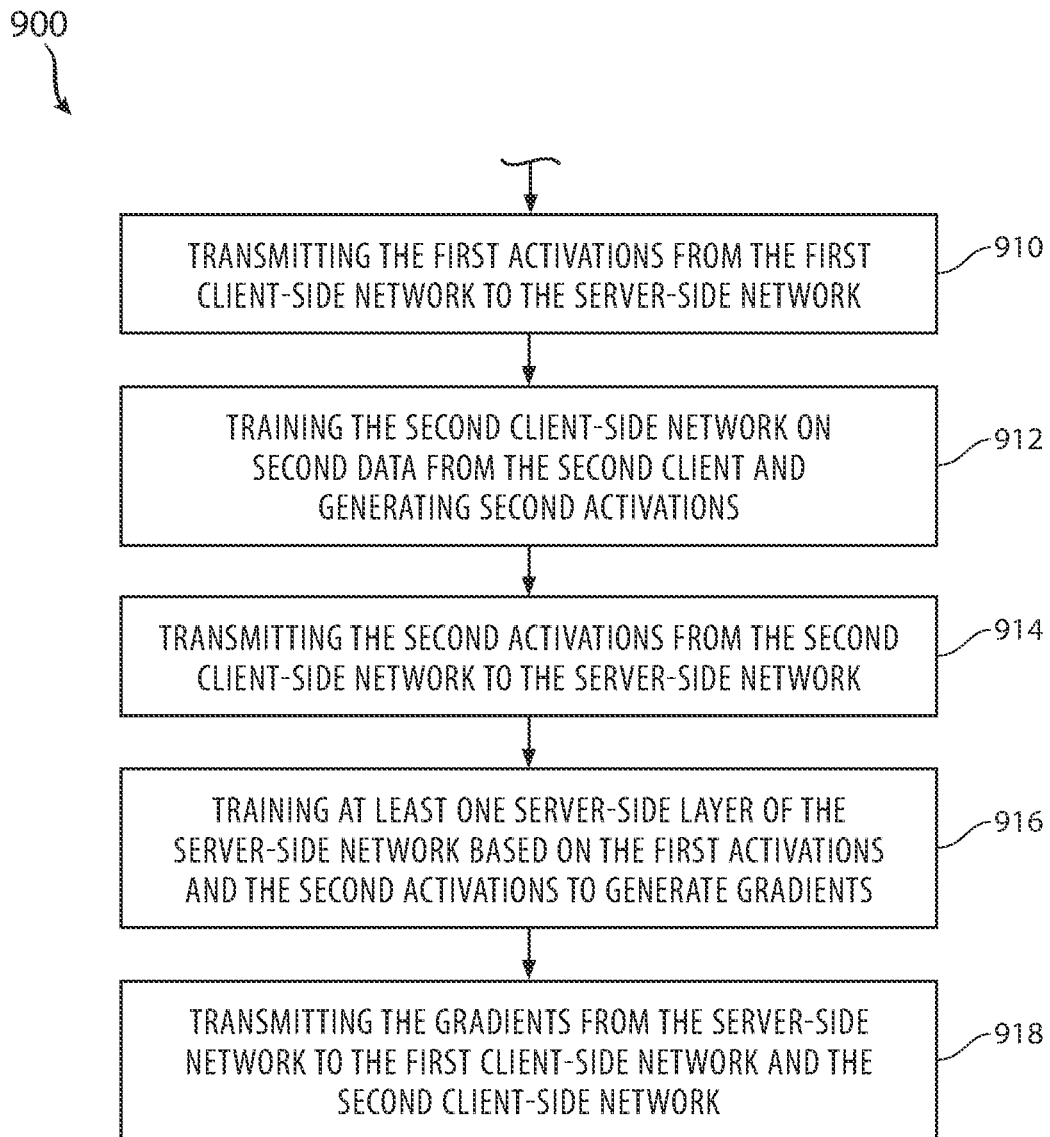

FIG. 9 illustrates an example method 900 from the standpoint of both a server 710 and one or more clients 702, 704, 706. The method can include splitting a neural network into a first client-side network, a second client-side network and a server-side network (902), sending the first client-side network to a first client, wherein the first client-side network is configured to process first data from the first client, the first data having a first type and wherein the first client-side network can include at least one first client-side layer (904), and sending the second client-side network to a second client, wherein the second client-side network is configured to process second data from the second client, the second data having a second type and wherein the second client-side network can include at least one second client-side layer, wherein the first type and the second type have a common association (906).

The method can further include training the first client-side network on first data from the first client and generating first activations (908), transmitting the first activations from the first client-side network to the server-side network (910), training the second client-side network on second data from the second client and generating second activations (912), transmitting the second activations from the second client-side network to the server-side network (914), training at least one server-side layer of the server-side network based on the first activations and the second activations to generate gradients (916) and transmitting the gradients from the server-side network to the first client-side network and the second client-side network (918).

The common association between the disparate types of data can include at least one of a device, a person, a consumer, a patient, a business, a concept, a medical condition, a group of people, a process, a product and/or a service. Any concept, device or person can be the common association or theme of the various disparate types of data that come from different clients and that are processed by different and independent client-side networks up to a cut or split layer. The server-side network can include a global machine learning model. The neural network can include weights, bias and hyperparameters. Hyperparameters typically relate to a parameter whose value is used to control the learning process, such as a topology parameter or a size of a neural network. For example, a learning rate, a mini-batch size, a number of layers on client side, or any parameter related to controlling the process that might impact or relate to different data types can represent a hyperparameter.

The at least one first client-side layer and the at least one second client-side layer each can include a same number of layers or a different number of layers. Because they operate independently, the client-side networks can have a different number of layers as long as they process their data to generate vectors or activations that are in a proper format for passing on to the server-side network for further training. A cut layer can exist between the server-side network and the first client-side network and the second client-side network.

Figure 10:
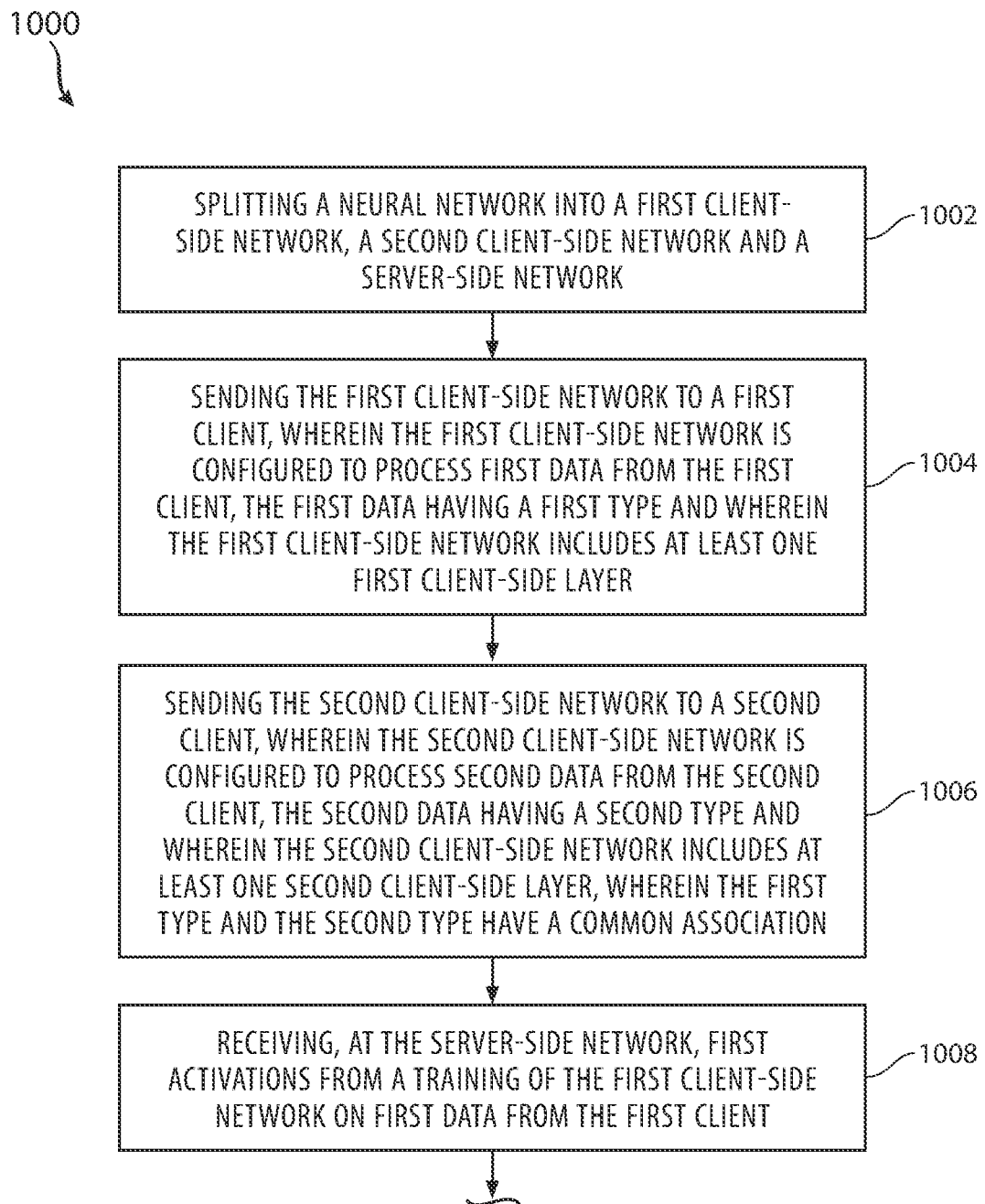
FIG. 10 illustrates a method embodiment.

FIG. 10 illustrates an example method 1000 from the standpoint of the server 710. A method can include splitting a neural network into a first client-side network, a second client-side network and a server-side network (1002), sending the first client-side network to a first client, wherein the first client-side network is configured to process first data from the first client, the first data having a first type and wherein the first client-side network can include at least one first client-side layer (1004) and sending the second client-side network to a second client, wherein the second client-side network is configured to process second data from the second client, the second data having a second type and wherein the second client-side network can include at least one second client-side layer, wherein the first type and the second type have a common association (1006).

The method can further include receiving, at the server-side network, first activations from a training of the first client-side network on first data from the first client (1008), receiving, at the server-side network, second activations from a training of the second client-side network on second data from the second client (1010), training at least one server-side layer of the server-side network based on the first activations and the second activations to generate gradients (1012) and transmitting the gradients from the server-side network to the first client-side network and the second client-side network (1014).

Note that in each case, part of the process of the server 710 in terms of training could be perform by the server 710 and other parts such as an averaging of values over the various clients could be performed by a different server (not shown) that could be at a client site, a separate location, or across different clients.

This approach enables the use of the blind-learning tool set in a new way that when the system splits up the neural network, at the blind decorrelation 708, the system can make it harder to take the resulting trained model, break it and apply a training inference attack. Because the system can break the neural network in half (or in two portions), and the way it is described above, all that is exchanged from the neural network parts 702A, 704A, 706A is a string or array of numbers, also described as activation layer numbers. Since these are only numbers or an array of characters, what happens at a first neural network portion 702A could be different from what happens at a second neural network portion 704A. For example, the first neural network portion 702A could be 2 layers deep and the second neural network portion 704A could be 90 layers deep. As long as each output resolves to a string of numbers that is structured appropriately for transmission to the top part of the neural network 710, then the forward propagation and the back propagation can work and the training can be achieved. This understanding paves the way for a new concept disclosed herein that different types of data handled across the different portions 702A, 704A, 706A of the neural network can be received and processed properly to train the models( ). If the system can create a different bottom half 702A, 704A, 706A for each of different clients, then the clients 702, 704, 706 don't have to produce or process the same type of data (between text and images, for example), but the properly formatted neural network portions 702A, 704A, 706A can process that disparate data, and produce the structured output that can be sent to the server 710.

In one example, client one 702 might provide a person's ECG, client two 704 can provide a chest X-ray of a heart can client three 706 can provide the genetic profile of the most four interesting proteins in the patient's blood. If the neural network portions 702A, 704A, 706A can process the different respective types of data down to the right vector structure for output, and provide the disparate types of data to the server 710, the server 710 can be configured with the proper neural network to combine all of that information to train a model to be used to make a diagnosis which can utilize the different and disparate types of data.

In one aspect, while the neural network portions 702A, 704A, 706A each process a different type of data, there is some correlating factor associated with the data. In the above example, all of the data may relate generally to the same person, although some data is ECG related and other data is associated with a genetic profile, yet they all are for the same person. Thus, one aspect of this disclosure is that the data does have a common association. In another aspect, the data may not be related to the same person but the common association could be related to an age, gender, race, project, concept, the weather, the stock market, or other factors. All of the data might relate to women between the ages of 30-35, for example. Thus, the common association has some flexibility to how it would be applied.

In another example, the data could be images from a camera of a jet engine stream, another stream of data could be sensor data, and other data could be flight characteristics from an airplane, and the common association could be the airplane. In another aspect, the common association could be a consumer with one type of data being purchasing habits, another type of data being web-surfing patterns, another type of data being emails that the user sends, another type of data being audio from Siri or other speech processing tools, and another type of data being what physical stores the consumer frequents or what is the user's current location. The output of the server could be an advertisement to provide to the user based on the analysis of the disparate types of input. Thus, the common association can relate to any concept that could be used in which disparate types of data can relate to the concept.

New Stuff from 116

Figure 11:
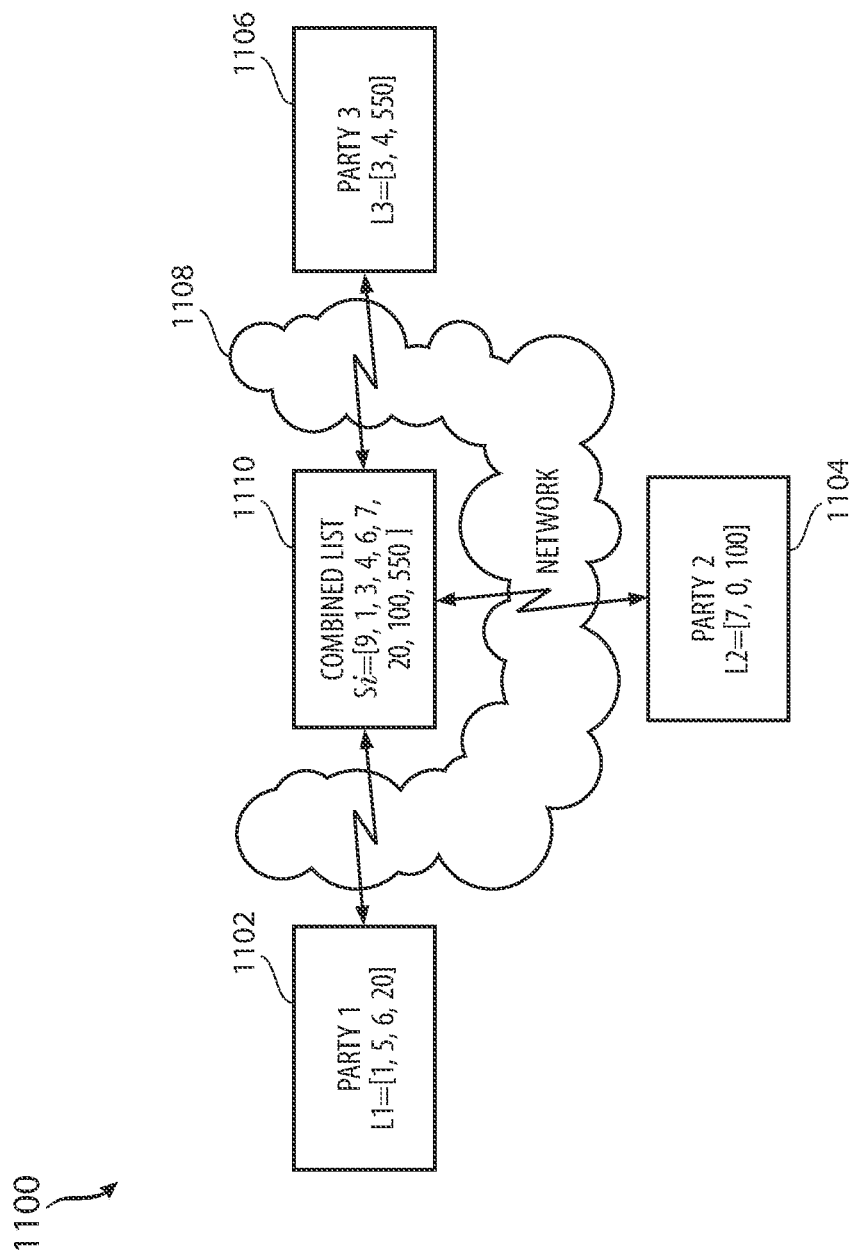
FIG. 11 illustrates a group of parties each with private data.
Figure 12:
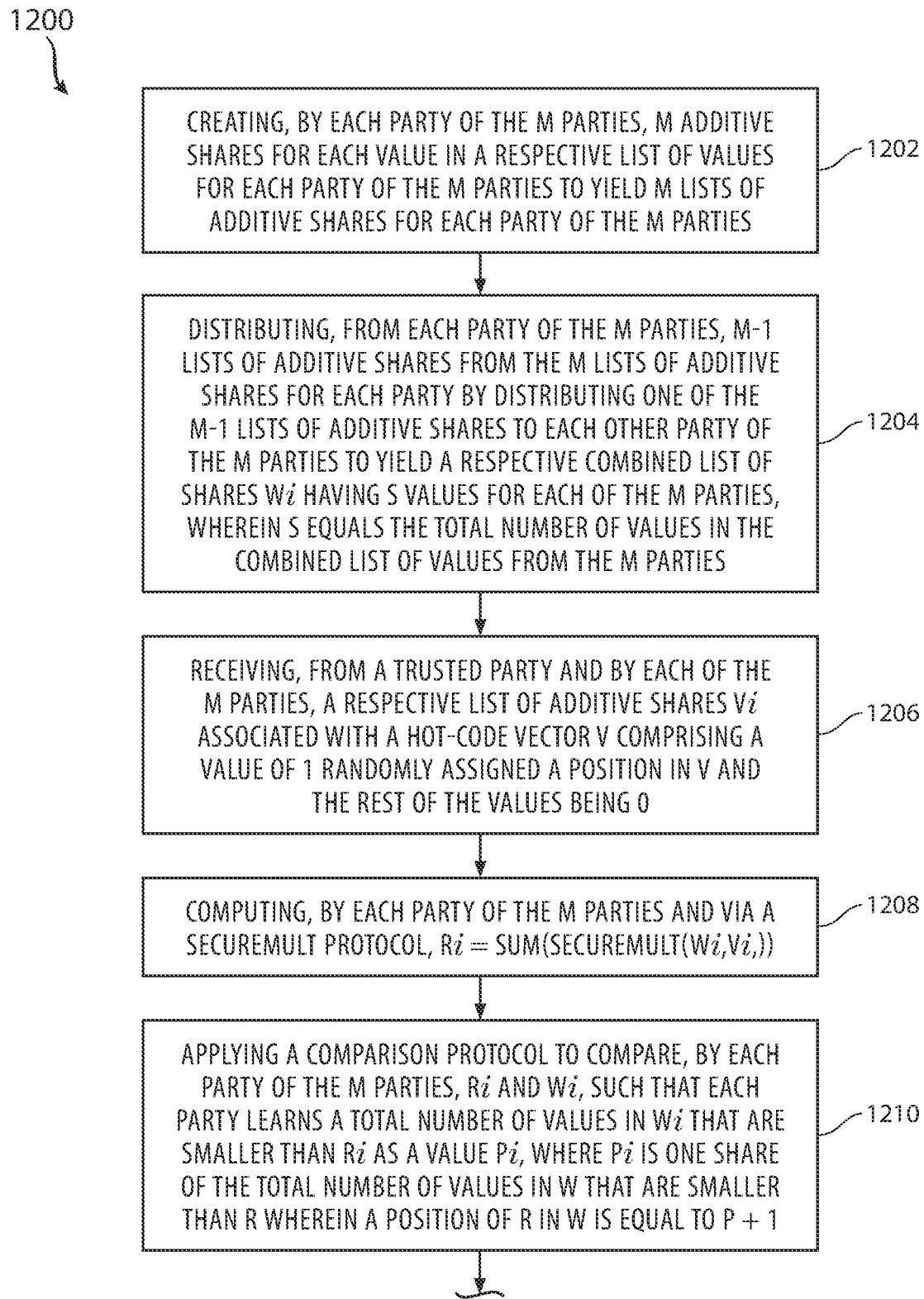
FIG. 12 illustrates a method embodiment
Figure 12:
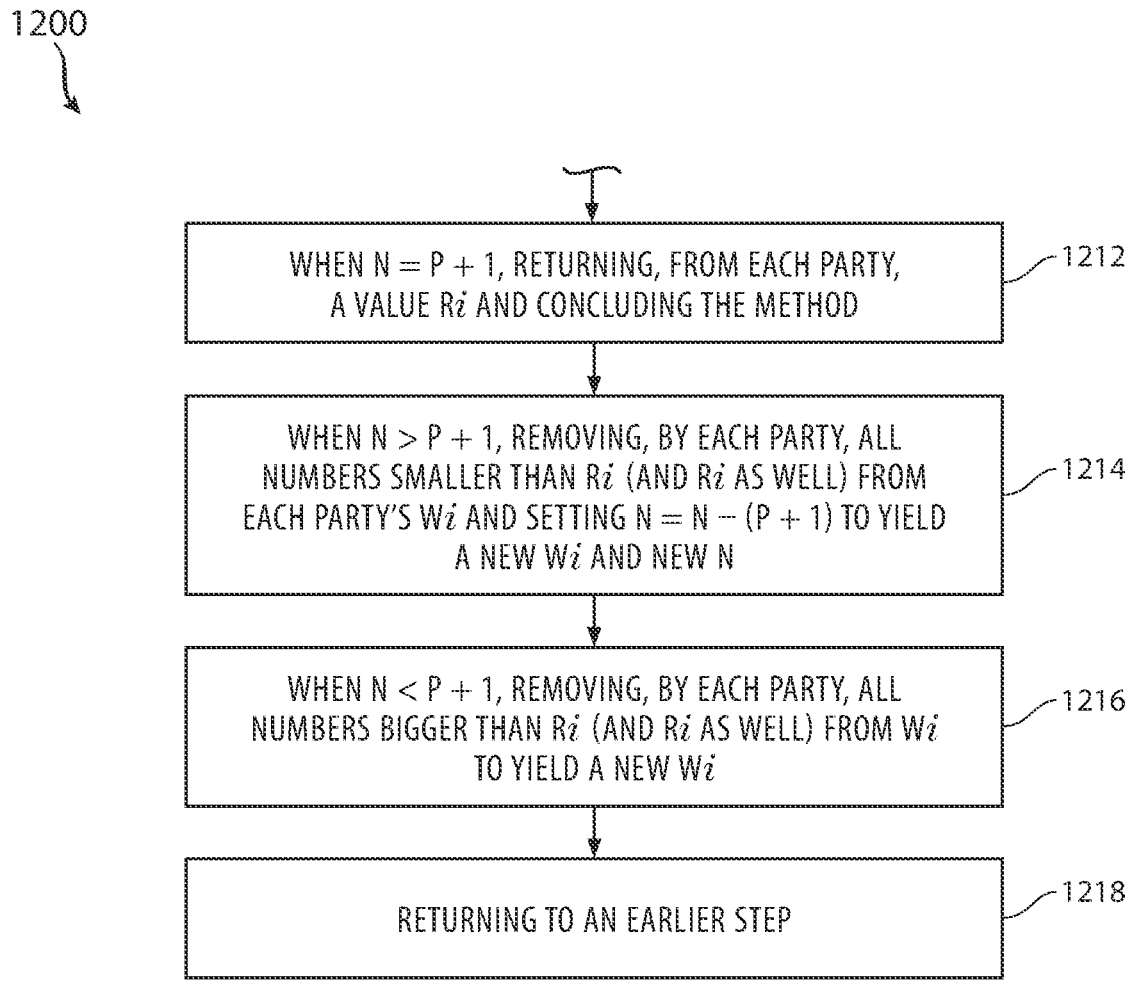
Figure 13:
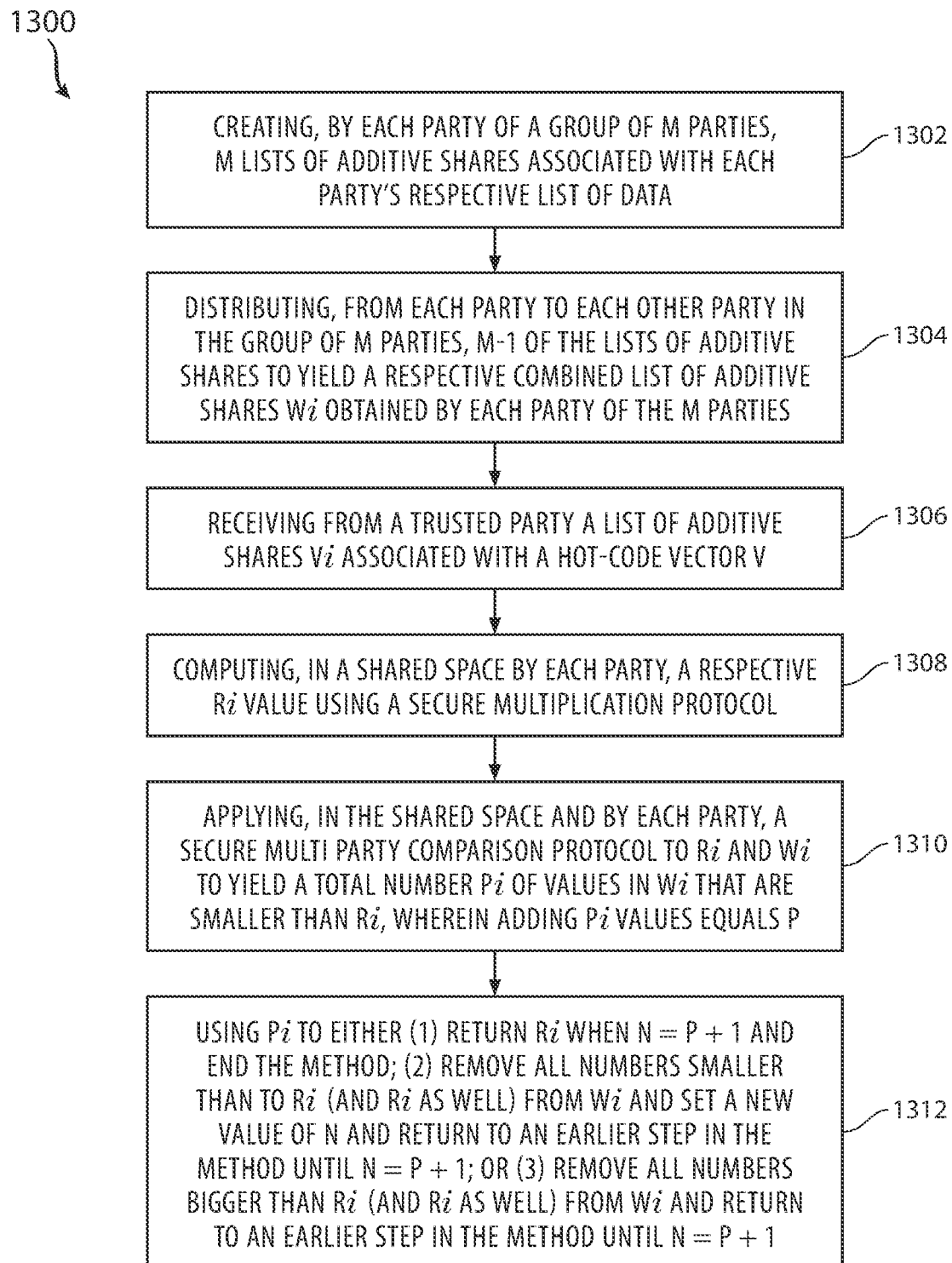
FIG. 13 illustrates another method embodiment.

A detailed example of how the process of obtaining "shares" of individual private data and then sharing that data between parties is explained with respect to FIGS. 11-13. The use of shares is part of the approach disclosed herein with respect to averaging the models and thus is important to understand. FIG. 11 illustrates a framework 1100 in which a first party 1102 has example data $L_1=[1, 5, 6, 10]$, a second party 1104 has a respective list of data $L_2=[7, 0, 100]$ and a third party 106 has its private data $L_3=[3, 4, 550]$. In one example, the various respective lists of data are stored on computer-readable media on various computer systems. Each of the components 1102, 1104, 1106 can represent the respective computer system of the respective party. The component 1108 can represent the shared list which includes each combined list of data from the respective parties 1102, 1104, 1106. Again, the respective lists can be shared over any type of network such as the Internet or a wireless network, cellular network and so forth.

Each party contributed their private lists of data to a combined list of data Si. Si=[0, 1, 3, 4, 5, 6, 7, 20, 100, 550]. Again, in one aspect, this is only in theory and the parties never actually share their data at a location that combined the various lists together. This figure therefore is used to show conceptually how the combined list might exist logically but not physically. The combined list in other words is the combination of the various lists that physically remain private on the computer systems of the various parties. The output of the solution disclosed herein is the Nth smallest value.

The number of participants can be termed "m" and $1 \leq i \leq m$. The total numbers in the combined list Si is S=s1+ . . . +sn. The algorithm disclosed herein enables the various parties to securely compute the Nth value of the combined list Si. Note that the approach could be used a number of different times to find various Nth values. Also note that in this example, the data is numerical although in other aspects the data might not be numerical or might be a combination of numerical data and non-numerical data.

Next, several examples shall be provided of the algorithm in practice. Assume in one example that there are the three parties shown in FIG. 11 with data: L1=[1, 5, 6, 10], L2=[7, 0, 100] and L3=[3, 4, 550]. The sorted combined list is $S_i$=[0, 1, 3, 4, 5, 6, 7, 20, 100, 550]. An unsorted list can be W=[1, 5, 6, 20, 7, 01, 100, 3, 4, 550]. The goal is to determine or compute the Nth value in the combined list. Note that the list, if it were sorted as in $S_i$ above, that the third position, for example, would have a value of 3. In the example, we'll assume that the goal is to find the value in the third position. The value of N can be set by the participants or in some other fashion.

The value of m is the number of participants which is 3 in this case. The value sj is the number of data in the list belonging to a user j. For example, user 1 has a sj value of 4 and the other two users have a sj value of 3. The value S is the total number of the data s1+s2+ . . . +2m, which in this case is 10.

The SMPC (secure multi-party computation) protocol disclosed herein is equipped with SecureMult and Secure-Compare on Ring R. An example of such protocols is found in U.S. patent application Ser. No. 16/828,216, filed on Mar. 24, 2020. The contents of this application are incorporated herein by reference. These are multi-party primitives enabling parties to perform multiplication and comparison securely as would be known by one of skill in the art. A ring is a set equipped with two binary operations and which prevents values from becoming too large. A ring is a set R equipped as noted above with two binary operations which can be + (addition) and * (multiplication) satisfying three sets of axioms called ring axioms. First, R is an abelian group under addition that has a number of requirements. Next, R is a monoid under multiplication with several requirements and third, the multiplication is distributive with respect to addition with several distributivity requirements. One of skill in the art will understand more of the ring structure in math.

In this example Ring R=[Z]264. This means that all the integers from 0 to 264 in the ring. The modulus of the ring is 264. In this example, the maximum value of the ring is 264 and if a number goes above 264, it gets wrapped around and starts over at 1. For example, if the modulus is 7, and a number being processed by the ring results in 11 (such as 5+6), the value would not be 11 because the maximum value of the ring is 7, but the number of would be 4. The reasons for the use of the Ring is to prevent the use of unlimited or infinite numbers when performing the operations disclosed herein.

The protocol or algorithm includes performing a loop of steps until the loop ends on step (5). The first (1) step involves one of the parties creating m additive shares (m−1 shares for other users and 1 for themselves) from their list and distributing them among the other users and themselves. The goal of step (1) is to generate three sets of shares W1, W2, W3 of the set W used for the rest of the process to enable the parties to compute the Nth smallest value of the combined list securely.

To do so, user number i, for each element A in their respective list, generates m−1 random numbers r1, . . . , ri−1, ri+1, . . . , rm−1 (from the Ring) and distributes them between the other parties and sets their own share: ri=A—r1−r2− . . . −ri−1−ri+1 . . . −rm−1.

Note that in step (1), each party computes their additive shares for each value A in their respective lists and shares the (m−1) additive shares (one share of the group of additive shares) to the other parties and computes their own additive share for their own value in the propose position.

This setup is needed to use the SMPC PROTOCOL which uses both the SecureMult and SecureCompare algorithms. See the patent application incorporated above by reference for data on the SecureCompare algorithm and how it works in practice.

In the above example, party 2 has [7, 0, 100]. For each number in the list (say 7 for party 2), the respective party generates 2 random numbers (say 5, −2) and sends r1=5 to party 1 and sends r3=−2 to party 3 and sets his own share r2=7−5−(−2)=4. If the system adds 5, −2 and 4, the result is 7 and that's why this is called additive sharing. This process will be repeated for all numbers in the list. Each party gets only one share of the original value (7). The end of this process, for the one value 7 for the first party, each party's share will be as follows: Part 1 share: 5; Party 2 share: 4; Party 3 share: −2. For each number in each list, each party gets one number as a "share" of that number. If the system repeats the process for all numbers in all lists, each party will end up with S=s1+s2+ . . . +sm shares. S=10 in this example.

In one example, here could be an example of the sets of shares each party would have. If these lists are added, the W=[1, 5, 6, 20, 7, 0, 100, 3, 4, 550] would be obtained:

$W_1$=[3, 0, 2, −3, 4, 5, 50, 12, 8, 214]
$W_2$=[−4, 7, 3, 14, 6, 4, 35, −9, 2, 150]
$W_3$=[2, −2, 1, 9, −10, −2, 15, 0, −6, 186]

Note how for each position, if all the numbers are added, the appropriate value of W is obtained. Such as position 3, in which 2+3+1=6. Each party only has access to the respective list of shares which hides the values of the data from the other parties.

Next in step (2), each party gets a share of a one-hot-code vector V of size S created by a trusted party. The goal of step (2) is to generate three sets of shares V1, V2, V3 associated with a hot-code vector V. Another goal is to select one of the numbers in the list randomly without letting the parties know which number that was selected. In other words, the goal is to select one number from the list of 10 numbers randomly but not tell the party which number they are evaluating. Each party has 10 numbers in their share of the combined list.

The trusted party can have a computer system that performs the operations disclosed herein with the proper security and structure and management to consider being a trusted party. A hot-code vector is a vector consisting of only 0's and a 1 in which there is only a single "1" in the vector with all the other values being zero. In one example, V=[0, 0, 0, 0, 0, 1, 0, 0, 0, 0]. In this example, it is the 6th position in the set of 10 values that is selected. However, how the system selects this number without telling the partis which value is being evaluated. Note that each of these 0's and the 1 is an additive share as defined above. For example, the system can generate randomly three sets of numbers:

$V_1$=[3, 4, 5, . . . ]
$V_2$=[−4, −4, 3, . . . ]
$V_3$=[1, 0, −8, . . . ].

The three parties will each get one of the randomly-generated set of numbers V1, V2, V3. The use of these three sets of numbers hides the selected number (the 6th position of V). Note that in the first position, the three shares (3, −4, 1) add up to zero. The second position of the various V1, V2, V3 sets of numbers includes (4, −4, 0) which adds up to zero, the third position adds up to zero as well (5+3−8) and so forth. The sixth position of V has the "1" and the three shares in that case would add up to 1. Each of these sets of numbers is a respective V set. In step (3), each party, with their respective Vi set of numbers computes Ri=Sum(SecureMult (Wi,Vi)). For example, if W1=[3, 0, 2, −3, 4, 5, 50, 12, 8, 214] and V1=[3, 4, 5, 3, −2, 9, 3, 8, 3, −4], then the sum of the secure multiplication of W1 and V1 (W1*V1) is 3*3+ 0*4+2*5+(−3)*3+ . . . 214*(−4)=R1. Assume in this example that R1=9, R2=17 and R3=−6. These represent a share of a randomly selected number from the sets. There may be more details about how this secure multi-party multiplication operates to obtain these values but at a high level this is how it works. If you add these three numbers (9, 17 and −6), the result is 20.

Note that from the original W=[1, 5, 6, 20, 7, 0, 100, 3, 4, 550], the value of 20 is the in the 8th position of this list or the 8th smallest value. Each party then has a "share" at the end of step (3) of the 8th smallest value in the list or the number 20. None of the parties knows the number 20 but have shares of the number 20.

Note as well that if V=[0, 0, 0, 1, 0, 0, 0, 0, 0, 0] then the actual sum of the secure multiplication of V with W would be [0, 0, 0, 20, 0, 0, 0, 0, 0, 0], or 0+0+0+20+0 . . . +0=20. Neither the system nor the parties do this computation as they only have shares of W and V.

Next, step (4) involves running the SecureCompare protocol on Ri and Wi to find the position of Ri in Wi. The parties get a set of V1, V2, V3 or shares of V as part of the SecureCompare protocol.

Each party runs the SecureCompare (Ri, Wi) protocol and gets one share of the final result. The protocol returns the comparison result in "real space".

In step (5), if N=Pi+1 the protocol stops and returns Ri. In this case, N, the position the parties are trying to determine, is 3 and thus N does not equal 8 and the protocol is not ready to end but moves on to step (6).

Step (6) involves determining if N>Pi+1, which it is not. If it was, the system would remove all numbers smaller than Ri from their shares of W (or their Wi set) and set N=N−(Pi+1). The process would then loop back to step (2) with the smaller number of shares in the respective Wi list.

In step (7), if N<Pi+1, then the system removes all number bigger than or equal to Ri (8) from their shares of W and then returns to step (2). In this case, since 3 is less than 8, for party 1, the new W1 becomes [3, 0, 2, −3, 4, 5, 8] with 50, 12, 214 being removed.

Then, with the new W1, the system now has 7 values in this set and once the steps are performed by each of the three parties, the process starts returns to step (2) with a new set of W1, W2, W3.

FIG. 12 illustrates an example method 1200 embodiment related to the use of shares to determine an Nth smallest avlue. The method 1200 enables separate parties to compute securely an Nth smallest value in a combined list of values from m number of parties W. In one example, the method is performed across multiple computing devices (an example of which is in FIG. 15) in that each party has their own secure computing systems and share data with each other but then perform the computations and comparisons securely on their own systems with the data they receive.

The method 1200 can include (1) creating, by each party of the m parties, m additive shares for each value in a respective list of values for each party of the m parties to yield m lists of additive shares for each party of the m parties (1202), (2) distributing, from each party of the m parties, m−1 lists of additive shares from the m lists of additive shares for each party by distributing one of the m−1 lists of additive shares to each other party of the m parties to yield a respective combined list of shares Wi having S values for each of the m parties, wherein S equals the total number of values in the combined list of values from the m parties (1204), (3) receiving, from a trusted party and by each of the m parties, a respective list of additive shares Vi associated with a hot-code vector V comprising a value of 1 randomly assigned a position in V and the rest of the values being 0 (1206), (4) computing, by each party of the m parties and via a SecureMult protocol, Ri=Sum(SecureMult(Wi,Vi)) (1208), (5) applying a comparison protocol to compare, by each party of the m parties, R against all elements in W, such that each party learns a total number of values in W that are smaller than R as a value Pi, where Pi is one share of the total number of values in W that are smaller than R and after combining all Pi values, all parties learn P, wherein a position or R in W is equal to P+1 (1210), (6) when N=P+1, returning, from each party, a value Ri and concluding the method (212), (7) when N>P+1, removing, by each party, all numbers smaller than Ri (and Ri as well) from each party's Wi and setting N=N−(P+1) to yield a new Wi and new N (1214), (8) when N<P+1, removing, by each party, all numbers bigger than Ri (and Ri as well) from Wi to yield a new Wi (1216) and (9) returning to an earlier step such as step (3) (1218). Other secure multiplication and comparison protocols can be used as well other than those listed above for the parties to be able to compute the data they need in a secure way.

The hot-code vector V has a number of values equal to S. This number of values S can change as the method iterates because the respective values of Wi are reduced in iterations which don't end in step (6). In step (7) the respective Wi is reduced where all numbers smaller or equal to Ri are removed and in step (8) it's all numbers bigger than or equal to Ri are removed from Wi. As these operations are performed in the shared space, it is each party operating on their "additive shares" that they received from the other parties and not on the actual raw data. This can be in contrast to "real space" in which the parties are operating on the real data and not additional shares of the data.

The comparison protocol can be the SecureCompare protocol as discussed above. The method can loop or iterate from step (9) to step (3) until N=Pi+1. At that point, the method is done and the value of Ri is returned to the other parties or each respective party knows the value of Ri. Because each party operates in the "shared space" where they are operating on lists of numbers that are "shares" of the actual raw data, each party does not know what numbers are being compared. An owner of a value in the combined list only learns in the end that the value in the combined list W is smaller or bigger than a number the owner of the value does not know from the combined list W. The SecureMult protocol and the SecureCompare protocol operate on a Ring R set equipped with two binary operations. In one example, the Ring R=[Z]264 but other values of the modulus 264 can also be used as needed depending on the application of the method. The SecureMult protocol and the SecureCompare protocol include multi-party computation primitives enabling each party to perform multiplication and comparison securely.

In another example, each party will have a secure and separate computer server or system. The operations disclosed herein can also be considered from eth standpoint of each party's computer and what operations are just performed at that location. A system in this regard can be used for enabling separate parties to compute securely an Nth smallest value in a combined list of values from m number of parties W, the system being operated by one of the parties of the m parties. The system can include a processor and a computer-readable storage device storing instructions which, when executed by the processor, cause the processor to perform operations including (1) creating m additive shares for each value in a respective list of values for each party of the m parties to yield m lists of additive shares for each party of the m parties, (2) distributing m−1 lists of additive shares from the m lists of additive shares for each party by distributing one of the m−1 lists of additive shares to each other party of the m parties to yield a respective combined list of shares Wi having S values for each of the m parties, wherein S equals the total number of values in the combined list of values from the m parties, (3) receiving, from a trusted party, a respective list of additive shares Vi associated with a hot-code vector V comprising a value of 1 randomly assigned a position in V and the rest of the values being 0, (4) computing, via a SecureMult protocol, Ri=Sum (SecureMult(Wi,Vi), (5) applying a comparison protocol to compare R against all elements in W, to learn a total number of values in Wi that are smaller than Ri as a value Pi, wherein Pi values add to equal P and wherein a position or Ri in Wi is equal to Pi+1, (6) when N=P+1, returning a value Ri and concluding the operations, (7) when N>P+1, removing all numbers smaller than Ri (and Ri as well) from each party's Wi and setting N=N−(P+1) to yield a new Wi and new N, (8) when N<P+1, removing all numbers bigger than or equal to Ri from Wi to yield a new Wi and (9) returning to an earlier step such as step (3).

Another method 1300 embodiment is shown in FIG. 13. This is a broader version of the method of FIG. 12. In this aspect, a method 1300 is used for determining an Nth smallest value in a list of combined values. The method 1300 includes creating, by each party of a group of m parties, m lists of additive shares associated with each party's respective list of data (1302), distributing, from each party to each other party in the group of m parties, m−1 of the lists of additive shares to yield a respective combined list of additive shares $W_i$ obtained by each party of the m parties (1304), receiving from a trusted party a list of additive shares $V_i$ associated with a hot-code vector V (1306), computing, in a shared space by each party, a respective $R_i$ value using a secure multiplication protocol (1308), comparing, in the shared space, by each party and using secure multi-party comparison protocol, the respective $R_i$ to all elements in the respective combined list of additive shares $W_i$ to yield a total number $P_i$ of values in $W_i$ that are smaller than $R_i$, wherein adding $P_i$ values or shares equals P (1310) and using P to either (1) return $R_i$ when N=P+1 and end the method: (2) remove all numbers smaller than $R_i$ (and $R_i$ as well) from $W_i$ and set a new value of N and return to an earlier step in the method until N=P+1; or (3) remove all numbers bigger than $R_i$ (and $R_i$ as well) from $W_i$ and return to an earlier step in the method until N=P+1 (1312).

The method 1300 can be performed be each party's computer system or as a group where various parties perform their portions of the operations of receiving data, distributing data (shares) and performing the multi-party operations to learn about the results of the comparison.

Training and Inference of Decentralized Recommendation Systems

Figure 14:
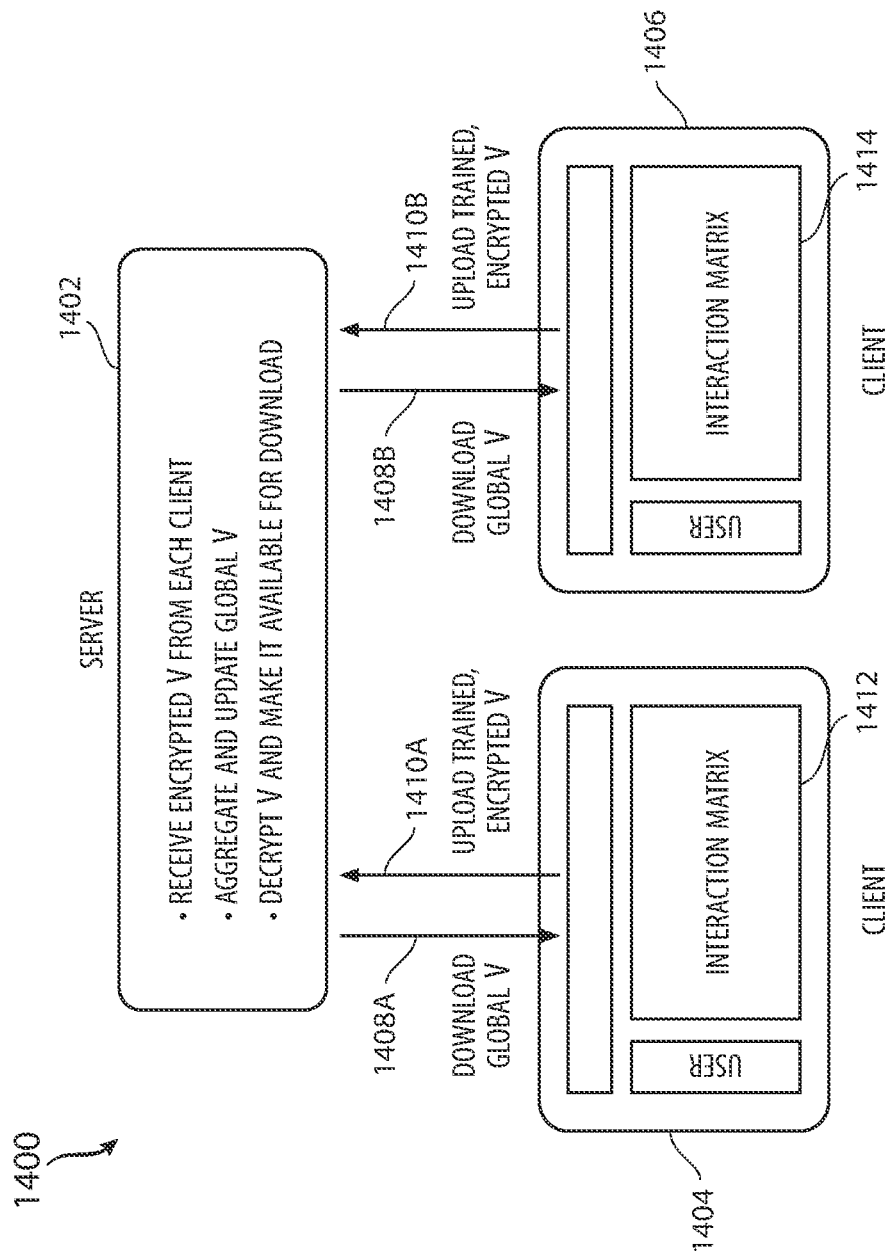
FIG. 14 illustrates an example approach for training a recommendation system using decentralized data.

This disclosure now turns to the subject matter of the present claims. The following concepts relate to training and inference of decentralized recommendation systems. The context of this disclosure could be, for example, a chain of stores such as Walmart where each store has some similar items for sale but some different items as well, plus separate customer data that has been gathered related to purchasing histories. FIG. 14 illustrates the approach 1400 in which a server 1402 performs such processes as receiving an encrypted vector V 1410*a*, 1410*b* from respectively a first client 1404 and a second client 1406. The clients can be different stores in a chain of stores. The server aggregates the vectors and updates a global vector V and decrypts the aggregated global vector and makes it available for download 1408*a*, 1408*b* to the client devices 1404, 1406.

The approach 1400 includes a new method to train recommendation systems from distributed data without harming the user's privacy or the privacy for example of customers who shop at a local store. The disclosure extends the collaborative filtering approach to train on decentralized data, utilize stochastic gradient descent for optimization, and secure multi-party compute (MPC) for matrix aggregation.

The approach includes enabling k parties (clients 1404, 1406) to securely compute a global recommendation system that resides at the server device 1402. To achieve this, a new version of the collaborative filtering (matrix-factorization) approach is introduced.

Consider the case of one server device 1402 and one client device 1404. Assume the client device 1404 is a data holder and has collected data on their customers and their purchases. The data can be any type of data such as ratings, purchase history, customer demographics, or other data. There are n customers and m items at the client device 1404 which can be associated with a particular store in one example. Each customer purchased (or rated) a number of items. The matrix that captures the customer-purchase relationship can be called an interaction matrix, M, and it is of the size n×m. The rating made by user i for item j can be characterized as $r_{ij}$. Note that customer i rated only a subset of all available items, m. A recommendation system's task is to find the ratings for each customer for all items and hence to predict the next item the customer is interested in.

An algorithm is introduced to recommend top r' items to each customer. The following steps can apply in any order. The server device 1402 initiates an item-vector matrix V $\in R^{m \times d}$ where m is the total number of items at all clients and d represents a hidden dimension, which can be assigned in a number of different says including an ad hoc way. The server 1402 shares the item-vector matrix V with all the clients 1404, 1406. Each client device 1404, 1406 trains their local matrix factorization model using their user vector U and item vector V using a stochastic gradient descent method. The vecture U can represent the user data local to the client. The stochastic gradient descent method is an iterative method for optimizing an objective function with suitable smoothness properties. It can be regarded as a stochastic approximation of gradient descent optimization, since it replaces the actual gradient (calculated from the entire data set) by an estimate thereof. The estimate can be calculated from a randomly selected subset of the data. Especially in high-dimensional optimization problems, this reduces the very high computational burden, achieving faster iterations in trade for a lower convergence rate.

Each client 1404, 1406 uses a secure MPC protocol to share the gradients (or encrypted vectors) of the item-vector matrix V with the server 1402. The server 1402 updates its local vector V using the received encrypted vectors from all clients 1404, 1406 using a direct subtraction process. The result is decrypted and made available at the server 1402 to be downloaded by the clients 1404, 1406. The training process ends when reaching a specific gradient threshold or a specified model accuracy. The system can make predictions for all customers on all items and then develop a method to extract the top r' items for each customer.

In one example, consider a chain of pharmacies in which each client or local pharmacy has their list of customers U, and items in an item-vector matrix V. The local pharmacy receives a larger list of items that covers all the items offered. The clients can train their local matrix factorization model based on the item-vector matrix V. Different clients or branches of the company own different data in that they have different sets of items and of course different customers. There might be overlap in many of the items offered by the branches. The company headquarters may want to train a recommendation system but each branch has customers with data that should not be shipped outside the branch. The approach is to only ship data about the items. The branches might have a table with a row being a customer and a column representing an item with 0's and 1's such that a I will be in the column of a purchased item. This can be called an interaction matrix with customer/item data. To train a good model across the branches 1404, 1406, the server 1402 first creates a list of all items across all clients, gives that to each client, and then each client trains a model using matrix factorization. Once the clients 1404, 1406 train their respective model, their item-vector matrix V is updated with new values. All of the clients send the item-vector matrix V matrices to the server 1402 and which will average all the matrices into an updated item-vector matrix V.

Figure 15A:
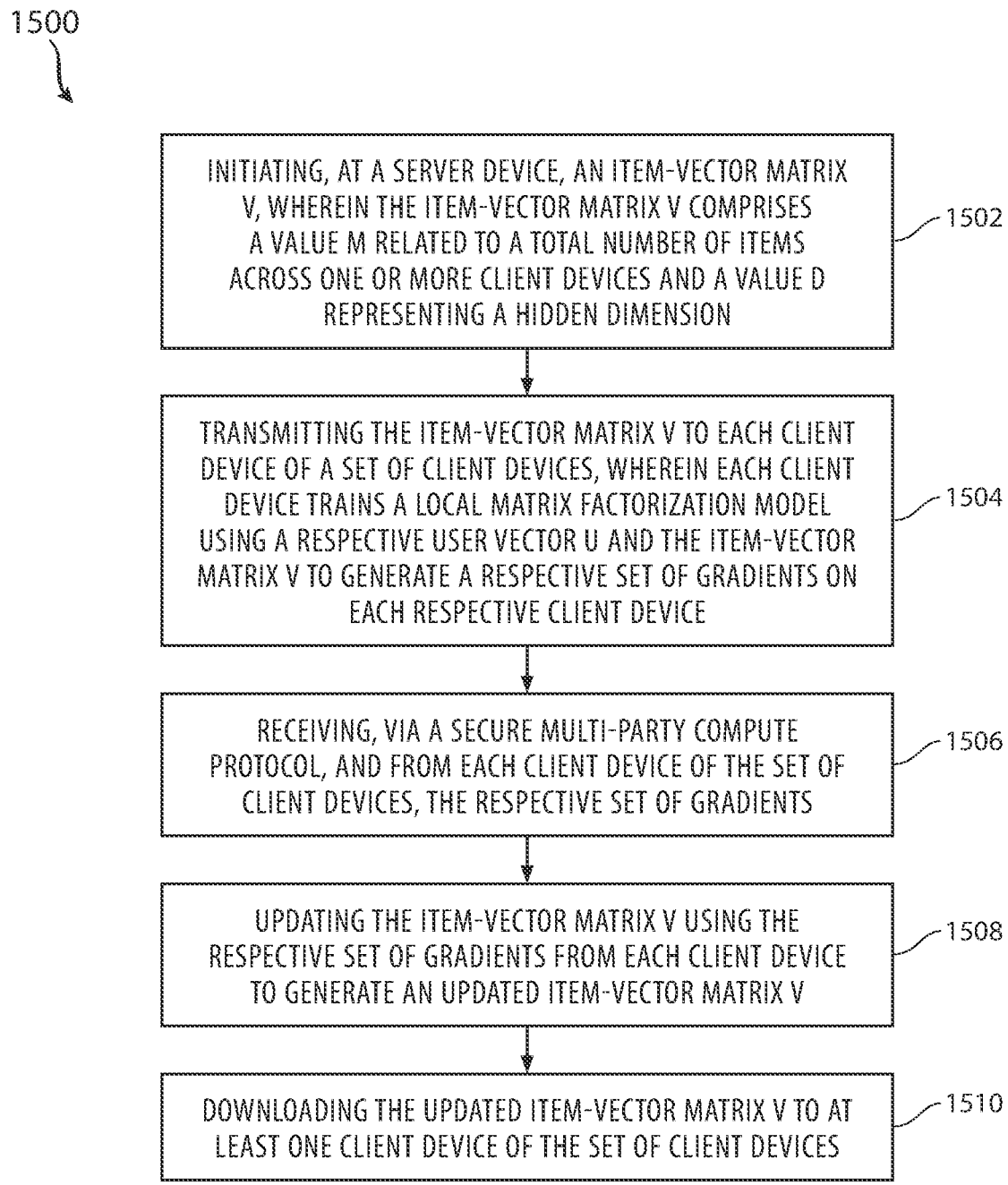
FIG. 15A illustrates a method of training a recommendation system from a standpoint of a server device.

FIG. 15A illustrates an example method 1500. The method includes initiating, at a server device, an item-vector matrix V, wherein the item-vector matrix V comprises a value m related to a total number of items across one or more client devices and a value d representing a hidden dimension (1502), transmitting the item-vector matrix V to each client device of a set of client devices, wherein each client device trains a local matrix factorization model using a respective user vector U and the item-vector matrix V to generate a respective set of gradients on each respective client device (1504), receiving, via a secure multi-party compute protocol, and from each client device of the set of client devices, the respective set of gradients (1506), updating the item-vector matrix V using the respective set of gradients from each client device to generate an updated item-vector matrix V (1508) and downloading the updated item-vector matrix V to at least one client device of the set of client devices (1510).

Each client device can train the local matrix factorization model using a stochastic gradient descent method or some other method. The respective set of gradients can be encrypted at each client device 1404, 1406.

The step of updating the item-vector matrix V at the server 1402 can occur using a privacy-preserving aggregation method. For example, one approach can include private set interaction.

The updated item-vector matrix V can be trained when a specific threshold is reached or a specific model accuracy is reached. In another aspect, each client device 1404, 1406 can predict top items based on the updated item-vector matrix V.

The secure multi-party compute protocol can include a secure multi-party compute inference protocol. In one aspect, the step of updating the item-vector matrix V using the respective set of gradients from each client device to generate an updated item-vector matrix V further can include aggregating the respective set of gradients from each client device to generate the updated item-vector matrix V.

The method can further include receiving, via the secure multi-party compute protocol, and from each client device of the set of client devices, an updated respective set of gradients and updating the updated item-vector matrix V using the updated respective set of gradients from each client device to generate a second updated item-vector matrix V.

In another aspect a system can be provided which may correspond to the server device 1402. The system 1402 can include a processor and a computer-readable storage device storing instructions which, when executed by the processor, cause the processor to perform operations. The operations can include one or more of initiating an item-vector matrix V, wherein the item-vector matrix V comprises a value m related to a total number of items across one or more client devices and a value d representing a hidden dimension, transmitting the item-vector matrix V to each client device of a set of client devices, wherein each client device trains a local matrix factorization model using a respective user vector U and the item-vector matrix V to generate a respective set of gradients on each respective client device, receiving, via a secure multi-party compute protocol, and from each client device of the set of client devices, the respective set of gradients, updating the item-vector matrix V using the respective set of gradients from each client device to generate an updated item-vector matrix V and downloading the updated item-vector matrix V to at least one client device of the set of client devices.

Figure 15B:
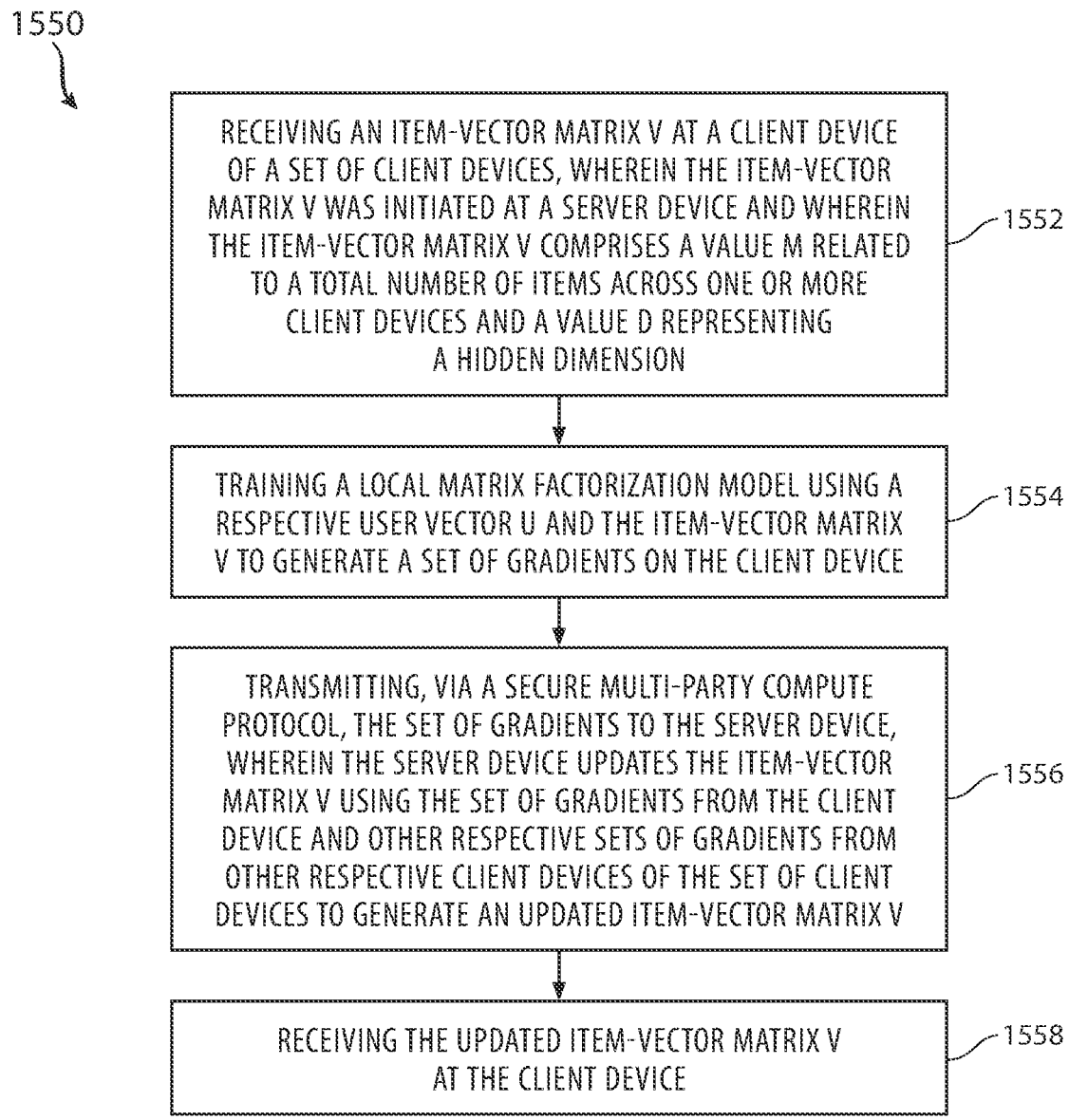
FIG. 15B illustrates a method of training a recommendation system from a standpoint of a client device.

FIG. 15B illustrates a method 1550 from the standpoint of a client device 1404, 1406. For example, the method 1550 can include receiving an item-vector matrix V at a client device of a set of client devices, wherein the item-vector matrix V was initiated at a server device and wherein the item-vector matrix V comprises a value m related to a total number of items across one or more client devices and a value d representing a hidden dimension (1552), training a local matrix factorization model using a respective user vector U and the item-vector matrix V to generate a set of gradients on the client device (1554), transmitting, via a secure multi-party compute protocol, the set of gradients to the server device, wherein the server device updates the item-vector matrix V using the set of gradients from the client device and other respective sets of gradients from other respective client devices of the set of client devices to generate an updated item-vector matrix V (1556) and receiving the updated item-vector matrix V at the client device (1558). The client device can train the local matrix factorization model using a stochastic gradient descent method.

A system can include the client device 1404, 1406 performing certain operations. In this regard, the system can include a processor and a computer-readable storage device storing instructions which, when executed by the processor, cause the processor to perform operations. The operations can include one or more of receiving an item-vector matrix V at a client device of a set of client devices, wherein the item-vector matrix V was initiated at a server device and wherein the item-vector matrix V comprises a value m related to a total number of items across one or more client devices and a value d representing a hidden dimension, training a local matrix factorization model using a respective user vector U and the item-vector matrix V to generate a set of gradients on the client device, transmitting, via a secure multi-party compute protocol, the set of gradients to the server device, wherein the server device updates the item-vector matrix V using the set of gradients from the client device and other respective sets of gradients from other respective client devices of the set of client devices to generate an updated item-vector matrix V and receiving the updated item-vector matrix V at the client device. The client device can train the local matrix factorization model using a stochastic gradient descent method.

Figure 16:
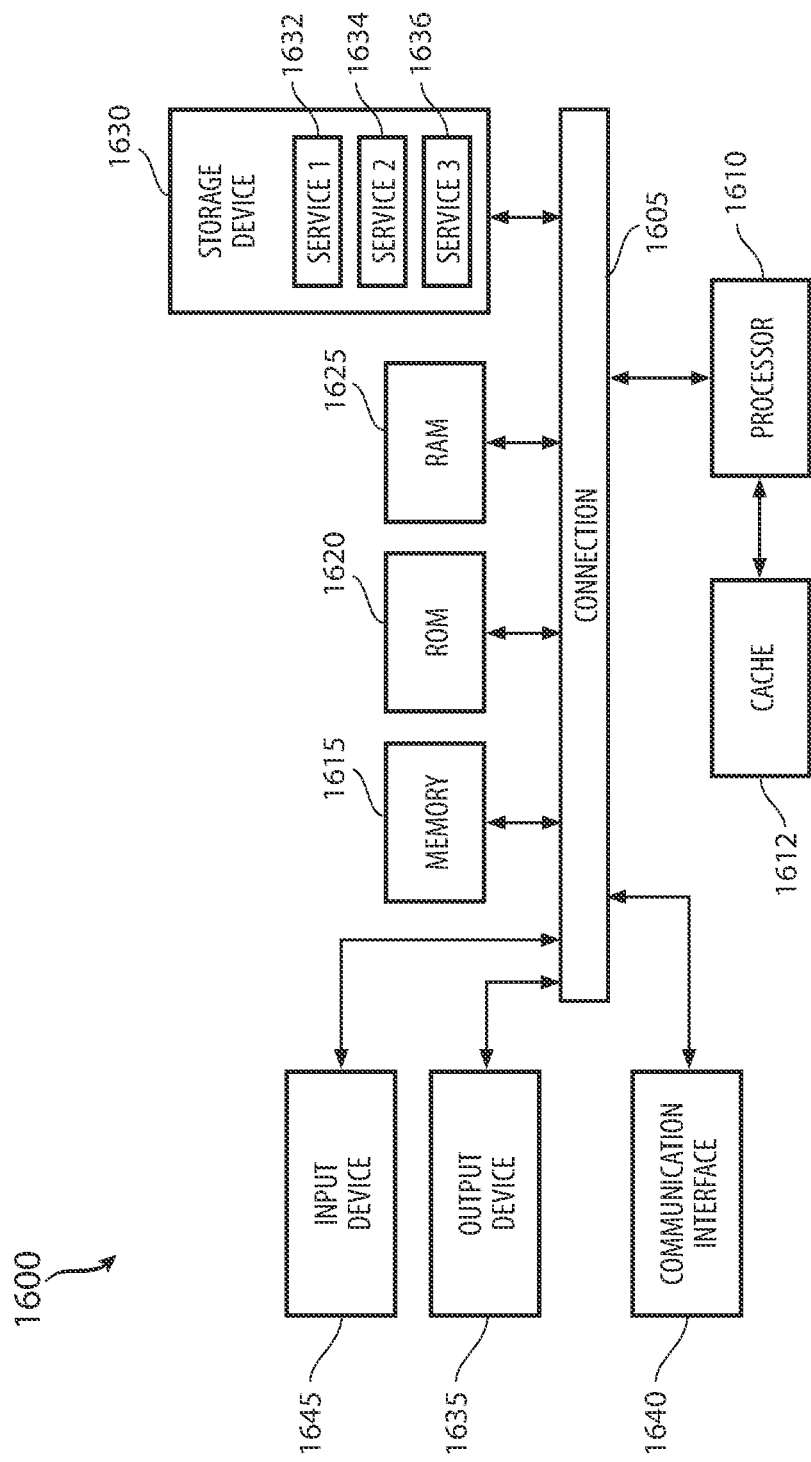
FIG. 16 illustrates a system embodiment.

FIG. 16 illustrates example computer device that can be used in connection with any of the systems disclosed herein. In this example, FIG. 16 illustrates a computing system 1600 including components in electrical communication with each other using a connection 1605, such as a bus. System 1600 includes a processing unit (CPU or processor) 1610 and a system connection 1605 that couples various system components including the system memory 1615, such as read only memory (ROM) 1620 and random access memory (RAM) 1625, to the processor 1610. The system 1600 can include a cache of high-speed memory connected directly with, in close proximity to, or integrated as part of the processor 1610. The system 1600 can copy data from the memory 1615 and/or the storage device 1630 to the cache 1612 for quick access by the processor 1610. In this way, the cache can provide a performance boost that avoids processor 1610 delays while waiting for data. These and other modules can control or be configured to control the processor 1610 to perform various actions. Other system memory 1615 may be available for use as well. The memory 1615 can include multiple different types of memory with different performance characteristics. The processor 1610 can include any general purpose processor and a hardware or software service or module, such as service (module) 1 1632, service (module) 2 1634, and service (module) 3 1636 stored in storage device 1630, configured to control the processor 1610 as well as a special-purpose processor where software instructions are incorporated into the actual processor design. The processor 1610 may be a completely self-contained computing system, containing multiple cores or processors, a bus, memory controller, cache, etc. A multi-core processor may be symmetric or asymmetric.

To enable user interaction with the device 1600, an input device 1645 can represent any number of input mechanisms, such as a microphone for speech, a touch-sensitive screen for gesture or graphical input, keyboard, mouse, motion input, speech and so forth. An output device 1635 can also be one or more of a number of output mechanisms known to those of skill in the art. In some instances, multimodal systems can enable a user to provide multiple types of input to communicate with the device 1600. The communications interface 1640 can generally govern and manage the user input and system output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof.

The storage device 1630 can include services or modules 1632, 1634, 1636 for controlling the processor 1610. Other hardware or software modules are contemplated. The storage device 1630 can be connected to the system connection 1605. In one aspect, a hardware module that performs a particular function can include the software component stored in a computer-readable medium in connection with the necessary hardware components, such as the processor 1610, connection 1605, output device 1635, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    initiating, at a server device, an item-vector matrix V, wherein the item-vector matrix V comprises a value m related to a total number of items across one or more client devices and a value d representing a hidden dimension which is not directly observable from input or output;
    transmitting the item-vector matrix V to each client device of a set of client devices, wherein each client device trains a local matrix factorization model comprising a version of a recommendation system using a respective user vector U and the item-vector matrix V to generate a respective set of gradients on each respective client device;
    receiving, via a secure multi-party compute protocol to enable parties to perform multiplication and comparison securely, and from each client device of the set of client devices, the respective set of gradients;
    updating the item-vector matrix V using the respective set of gradients from each client device to generate an updated item-vector matrix V by aggregating the respective set of gradients from each client device to generate the updated item-vector matrix V; and
    downloading the updated item-vector matrix V to at least one client device of the set of client devices.

2. The method of claim 1, wherein each client device trains the local matrix factorization model using a stochastic gradient descent method.

3. The method of claim 1, wherein the respective set of gradients is encrypted at each client device.

4. The method of claim 1, wherein updating the item-vector matrix V at the server device using a privacy-preserving aggregation method.

5. The method of claim 1, wherein the updated item-vector matrix V is trained when a specific threshold is reached or a specific model accuracy is reached.

6. The method of claim 1, wherein each client device can predict top items based on the updated item-vector matrix V.

7. The method of claim 1, wherein the secure multi-party compute protocol comprises a secure multi-party compute inference protocol.

8. The method of claim 1, further comprising:
    receiving, via the secure multi-party compute protocol, and from each client device of the set of client devices, an updated respective set of gradients; and
    updating the updated item-vector matrix V using the updated respective set of gradients from each client device to generate a second updated item-vector matrix V.

9. A system comprising:
    a processor; and
    a computer-readable storage device storing instructions which, when executed by the processor, cause the processor to perform operations comprising:
        initiating an item-vector matrix V, wherein the item-vector matrix V comprises a value m related to a total number of items across one or more client devices and a value d representing a hidden dimension which is not directly observable from input or output;

transmitting the item-vector matrix V to each client device of a set of client devices, wherein each client device trains a local matrix factorization model comprising a version of a recommendation system using a respective user vector U and the item-vector matrix V to generate a respective set of gradients on each respective client device;

receiving, via a secure multi-party compute protocol to enable parties to perform multiplication and comparison securely, and from each client device of the set of client devices, the respective set of gradients;

updating the item-vector matrix V using the respective set of gradients from each client device to generate an updated item-vector matrix V by aggregating the respective set of gradients from each client device to generate the updated item-vector matrix V; and downloading the updated item-vector matrix V to at least one client device of the set of client devices.

10. The system of claim 9, wherein each client device trains the local matrix factorization model using a stochastic gradient descent method.

11. The system of claim 9, wherein the respective set of gradients is encrypted at each client device.

12. The system of claim 9, wherein updating the item-vector matrix V at the system using a privacy-preserving aggregation method.

13. The system of claim 9, wherein the updated item-vector matrix V is trained when a specific threshold is reached or a specific model accuracy is reached.

14. The system of claim 9, wherein each client device can predict top items based on the updated item-vector matrix V.

15. The system of claim 9, wherein the secure multi-party compute protocol comprises a secure multi-party compute inference protocol.

16. The system of claim 9, wherein the computer-readable storage device stores additional instructions which, when executed by the processor, cause the processor to perform operations further comprising:

receiving, via the secure multi-party compute protocol, and from each client device of the set of client devices, an updated respective set of gradients; and updating the updated item-vector matrix V using the updated respective set of gradients from each client device to generate a second updated item-vector matrix V.

17. A method comprising:

receiving an item-vector matrix V at a client device of a set of client devices, wherein the item-vector matrix V was initiated at a server device and wherein the item-vector matrix V comprises a value m related to a total number of items across one or more client devices and a value d representing a hidden dimension which is not directly observable from input or output;

training a local matrix factorization model comprising a version of a recommendation system using a respective user vector U and the item-vector matrix V to generate a set of gradients on the client device;

transmitting, via a secure multi-party compute protocol, the set of gradients to the server device, wherein the server device updates the item-vector matrix V using the set of gradients from the client device and other respective sets of gradients from other respective client devices of the set of client devices to generate an updated item-vector matrix V by aggregating the set of gradients from each client device to generate the updated item-vector matrix V; and receiving the updated item-vector matrix V at the client device.

18. The method of claim 17, wherein the client device trains the local matrix factorization model using a stochastic gradient descent method.

* * * * *